(12) United States Patent
Leathart et al.

(10) Patent No.: US 12,700,013 B2
(45) Date of Patent: Aug. 4, 2026

(54) SYSTEMS AND METHODS FOR DETERMINING ENTITY CHARACTERISTICS

(71) Applicant: Xero Limited

(72) Inventors: Timothy Matthew Leathart, Wellington (NZ); Mehika Manocha, Wellington (NZ); Rui Min, Wellington (NZ); Han Zhang, Wellington (NZ); Duncan Buchanan, Wellington (NZ); Shreyas Nagarajappa, Wellington (NZ); William Lester, Wellington (NZ)

(73) Assignee: Xero Limited, Wellington (NZ)

( * ) Notice: Subject to any disclaimer, the term of this patent is extended or adjusted under 35 U.S.C. 154(b) by 175 days.

(21) Appl. No.: 17/887,407

(22) PCT Filed: Apr. 14, 2021

(86) PCT No.: PCT/NZ2021/050064
§ 371 (c)(1),
(2) Date: Aug. 12, 2022

(87) PCT Pub. No.: WO2021/210993
PCT Pub. Date: Oct. 21, 2021

(65) Prior Publication Data
US 2023/0342792 A1 Oct. 26, 2023

(30) Foreign Application Priority Data
Apr. 15, 2020 (AU) .............................. 20209012000

(51) Int. Cl.
G06Q 30/0201 (2023.01)
G06F 18/2135 (2023.01)
(Continued)

(52) U.S. Cl.
CPC ... *G06Q 30/0201* (2013.01); *G06F 18/21355* (2023.01); *G06F 18/2321* (2023.01); *G06V 40/1365* (2022.01)

(58) Field of Classification Search
None
See application file for complete search history.

(56) References Cited

U.S. PATENT DOCUMENTS 8,866,816 B2 10/2014 Cardno
10,169,864 B1 1/2019 Bagherinia et al.
(Continued)

OTHER PUBLICATIONS

Principal Component Analysis [retrieved from internet on Jun. 4, 2021] <URL: https://web.archive.org/web/20041106071647/https://en.wikipedia.org/wiki/Principal_component_analysis> published on Nov. 6, 2004 as per Wayback Engine.
(Continued)

*Primary Examiner* — Rutao Wu
(74) *Attorney, Agent, or Firm* — Young Basile Hanlon & MacFarlane. P.C

(57) ABSTRACT

A computer-implemented method for determining entity characteristics. The method comprising: determining a numerical representation of each of a plurality of second entities, each numerical representation comprising a multi-dimensional vector characteristic of the respective second entity, wherein each second entity is associated with one or more first entities; reducing the dimensionality of the numerical representations to produce a plurality of reduced dimensionality numerical representations; and determining a specialisation of each of the plurality of first entities based on the respective reduced dimensionality numerical representations.

20 Claims, 13 Drawing Sheets

(51) Int. Cl.
*G06F 18/2321*        (2023.01)
*G06V 40/12*          (2022.01)

(56)                References Cited

U.S. PATENT DOCUMENTS

| | | | |
|---|---|---|---|
| 2006/0096447 | A1 | 5/2006 | Weare et al. |
| 2014/0279755 | A1* | 9/2014 | Xu .......................... G06N 20/10 706/12 |
| 2015/0127455 | A1* | 5/2015 | Penzotti ............. G06Q 30/0251 705/14.49 |
| 2017/0017897 | A1* | 1/2017 | Bugay ................... G06F 40/169 |
| 2017/0061286 | A1* | 3/2017 | Kumar ............... G06Q 30/0269 |
| 2019/0096135 | A1 | 3/2019 | Dal Mutto et al. |
| 2019/0272344 | A1* | 9/2019 | Lu ......................... G06V 10/761 |
| 2020/0250185 | A1* | 8/2020 | Anderson ........... G06F 16/2358 |
| 2021/0021621 | A1* | 1/2021 | Janakiraman ......... H04L 41/142 |

OTHER PUBLICATIONS

Nonlinear dimensionality reduction [retrieved from internet on Jun. 4, 2021] <URL: https://web.archive.org/web/20190509010019/ https://en.wikipedia.org/wiki/Nonlinear_dimensionality_ reduction> published on May 9, 2019 as per Wayback Engine.
International Search Report and Written Opinion as issued in connection with International Patent Application No. PCT/NZ21/ 50064, mailed Jun. 9, 2021, 15 pages.

* cited by examiner

400

402: Determine a numerical representation of each of a plurality of second entities 404: Reduce the dimensionality of the numerical representations 406: Determine a specialisation of each first entity

500

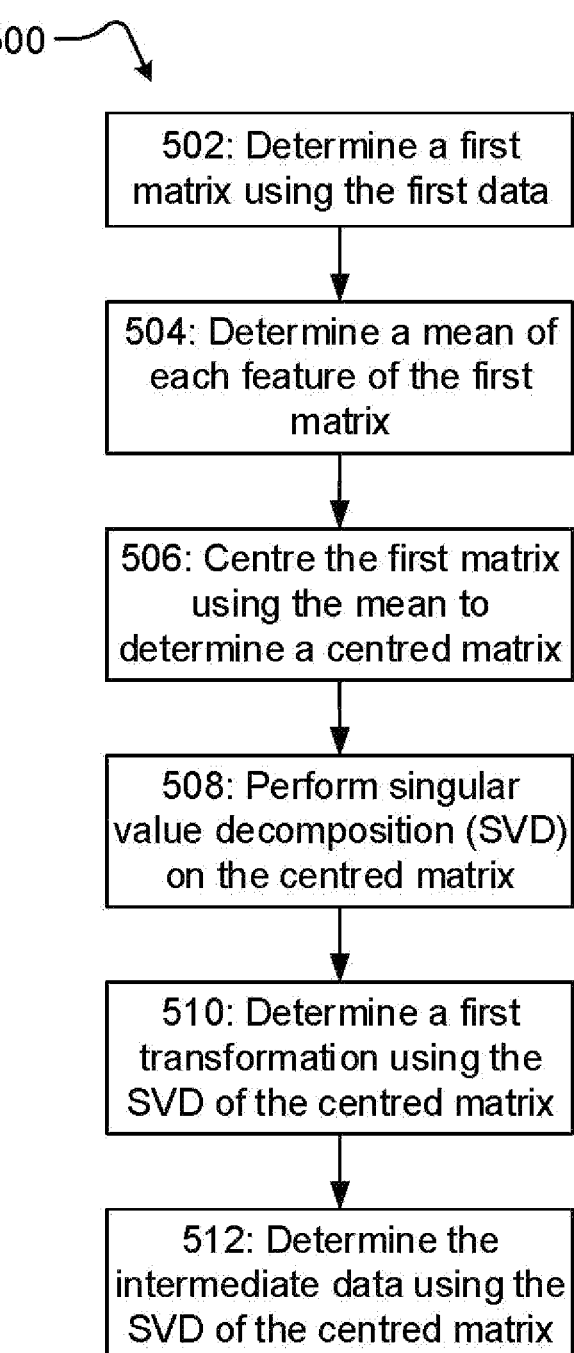

502: Determine a first matrix using the first data

504: Determine a mean of each feature of the first matrix

506: Centre the first matrix using the mean to determine a centred matrix

508: Perform singular value decomposition (SVD) on the centred matrix

510: Determine a first transformation using the SVD of the centred matrix

512: Determine the intermediate data using the SVD of the centred matrix

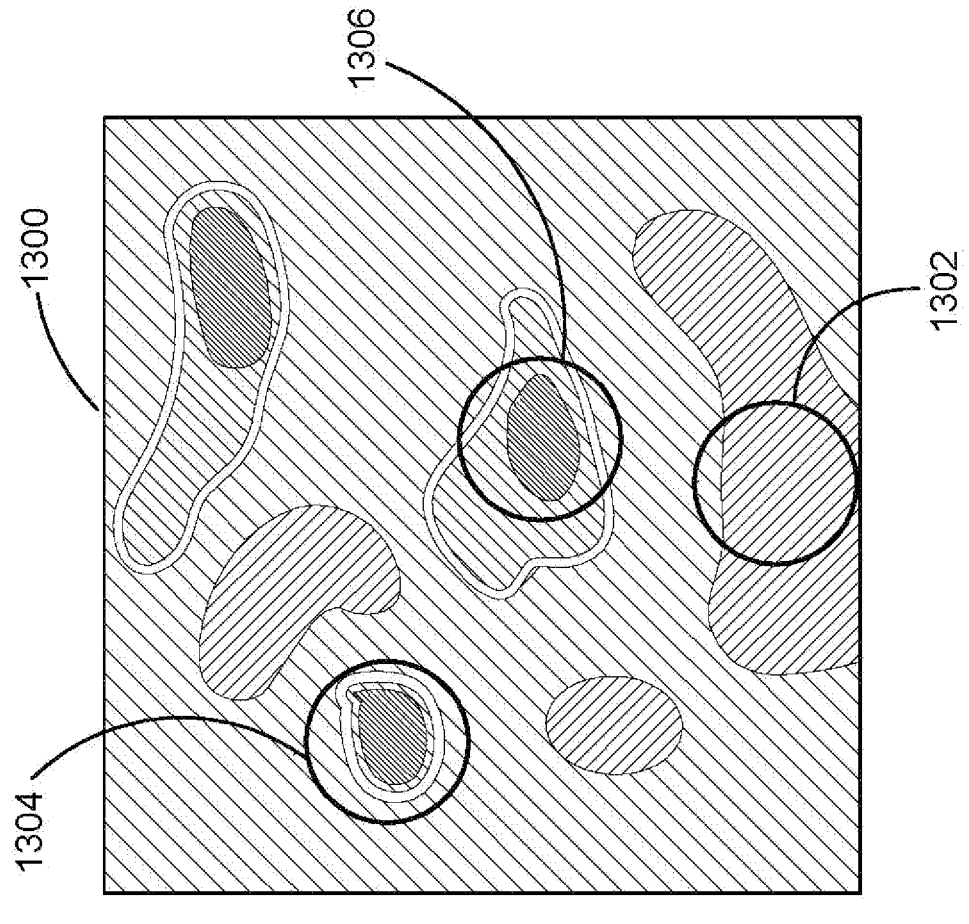
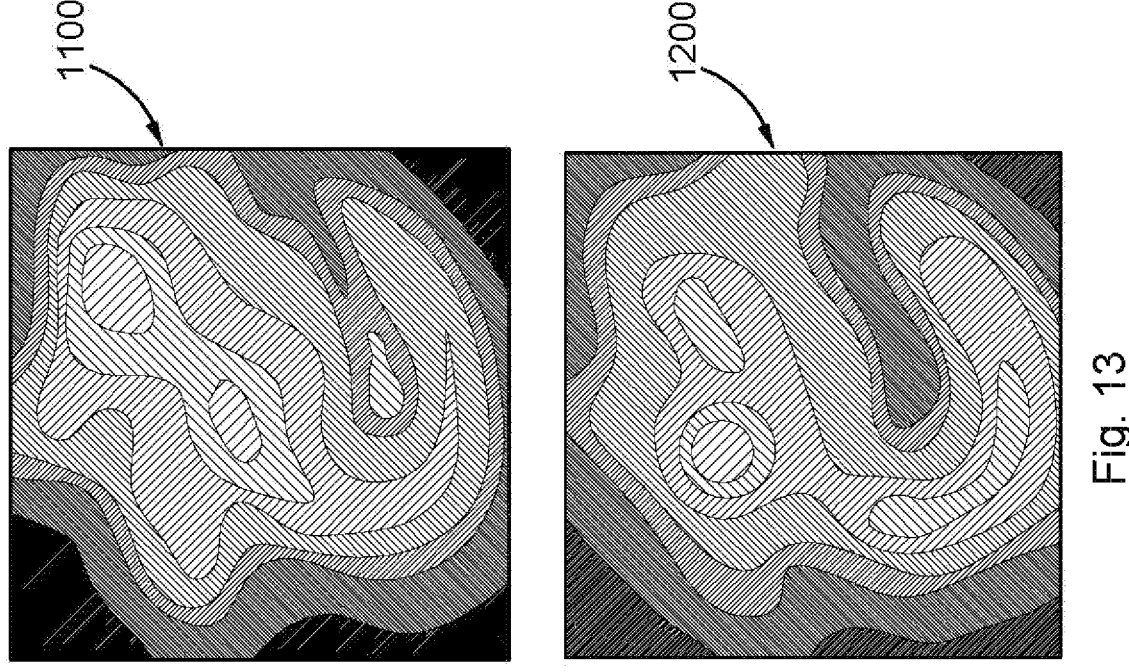
Fig. 13

SYSTEMS AND METHODS FOR DETERMINING ENTITY CHARACTERISTICS

TECHNICAL FIELD

Described embodiments relate to systems, computer-implemented methods and computer programs for determining entity characteristics. Some embodiments relate to determining characteristic representations or "fingerprints" of first entities based on a plurality of reduced dimensionality numerical representations of second entities associated with the first entity. Some embodiments relate to producing visual representations of such characteristic representations or "fingerprints". Some embodiments relate to providing first entity recommendations to users based on a comparison of the user's characteristic representation with those of a plurality of first entities.

BACKGROUND

Knowing their clients, including individuals and organisations, allows businesses to tailor services and experiences to suit their clients' needs and tastes. Similarly, for customers seeking to select a particular service provider, knowledge of key areas of specialisation of possible service providers can assist customers in selecting an appropriately qualified service provider. Such knowledge can be inferred from data collected about the customers or service providers. However, interpreting the data to determine meaningful insights into the customers or service providers can be difficult, particularly when the data comprises a large number of features.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a computer-implemented method for determining entity characteristics, the method comprising: determining a numerical representation of each of a plurality of second entities, each numerical representation comprising a multi-dimensional vector characteristic of the respective second entity, wherein each second entity is associated with one or more first entities; reducing the dimensionality of the numerical representations to produce a plurality of reduced dimensionality numerical representations; determining a specialisation of each of the plurality of first entities based on the respective reduced dimensionality numerical representations; determining a numerical representation of a candidate second entity; reducing the dimensionality of the numerical representation of the candidate second entity to produce a reduced dimensionality numerical representation of the candidate second entity; comparing the reduced dimensionality numerical representation of the candidate second entity to the specialisation of each of the plurality of first entities; and classifying the candidate second entity based on the comparison.

In some embodiments, determining the specialisation comprises determining a specialisation function of each of the plurality of first entities based on the respective reduced dimensionality numerical representations.

In some embodiments, determining the specialisation function comprises: centring a kernel function on each reduced dimensionality numerical representation of the second entities associated with the respective first entity; and summing the kernel functions, thereby determining the specialisation function.

In some embodiments, determining the specialisation comprises determining a specialisation numerical representation of each of the plurality of first entities.

In some embodiments, the specialisation numerical representation comprises one or more local maximum of the specialisation function.

In some embodiments, determining the specialisation of each of the plurality of first entities comprises a kernel density estimation.

In some embodiments, comparing the reduced dimensionality numerical representation of the candidate second entity to the specialisation of each of the plurality of first entities comprises comparing the reduced dimensionality numerical representation of the candidate second entity to the specialisation numerical representation of each of the plurality of first entities.

In some embodiments, reducing the dimensionality of the numerical representations of the second entities comprises performing principal component analysis on a first data set comprising the numerical representations of the second entities, thereby determining a plurality of intermediate numerical representations of the second entities.

In some embodiments, each intermediate numerical representation corresponds with a respective numerical representation.

In some embodiments, reducing the dimensionality of the numerical representations of the second entities comprises performing Uniform Manifold Approximation and Projection on an intermediate data set comprising the intermediate numerical representations of the second entities, thereby determining the plurality of reduced dimensionality numerical representations.

In some embodiments, each reduced dimensionality numerical representation corresponds with a respective intermediate numerical representation.

In some embodiments, the method further comprises providing an indication of the specialisation of one or more of the plurality of first entities.

In some embodiments, providing the indication comprises displaying a visual representation of the specialisation function.

In some embodiments, the method further comprises providing a recommendation of a first entity to the candidate second entity based on the classification.

In some embodiments, classifying the candidate second entity comprises determining a matching score for one or more of the first entities, the matching score being indicative of a suitability of the relevant first entity to the candidate second entity.

In some embodiments, the matching score is indicative of a suitability of the candidate second entity to the relevant first entity.

In some embodiments, the matching score is based on the comparison of the reduced dimensionality numerical representation of the candidate second entity to the specialisation of each of the plurality of first entities.

In some embodiments, the matching scores are each related to a distance between the reduced dimensionality numerical representation of the candidate second entity and the relevant specialisation numerical representation.

In some embodiments, the recommendation is determined based on the matching scores.

Some embodiments relate to a computer-readable storage medium storing instructions that, when executed by a computer, cause the computer to perform the method previously described.

Some embodiments relate to a computer-implemented method for determining entity characteristics, the method comprising: determining a numerical representation of each of a plurality of second entities, each numerical representation comprising a multi-dimensional vector characteristic of the respective second entity, wherein each second entity is associated with one or more first entities; reducing the dimensionality of the numerical representations to produce a plurality of reduced dimensionality numerical representations; and determining a specialisation of each of the plurality of first entities based on the respective reduced dimensionality numerical representations.

In some embodiments, the method further comprises classifying a candidate second entity to associate the candidate second entity with one of the first entities.

In some embodiments, classifying the candidate second entity comprises: determining a numerical representation of the candidate second entity; reducing the dimensionality of the numerical representation of the candidate second entity to produce a reduced dimensionality numerical representation of the candidate second entity; comparing the reduced dimensionality numerical representation of the candidate second entity to the specialisation of each of the plurality of first entities; and classifying the candidate second entity based on the comparison.

In some embodiments, determining the specialisation comprises determining a specialisation function of each of the plurality of first entities based on the respective reduced dimensionality numerical representations.

In some embodiments, determining the specialisation function comprises: centring a kernel function on each reduced dimensionality numerical representation of the second entities associated with the respective first entity; and summing the kernel functions, thereby determining the specialisation function.

In some embodiments, determining the specialisation comprises determining a specialisation numerical representation of each of the plurality of first entities.

In some embodiments, the specialisation numerical representation comprises one or more local maximum of the specialisation function.

In some embodiments, determining the specialisation of each of the plurality of first entities comprises a kernel density estimation.

In some embodiments, comparing the reduced dimensionality numerical representation of the candidate second entity to the specialisation of each of the plurality of first entities comprises comparing the reduced dimensionality numerical representation of the candidate second entity to the specialisation numerical representation of each of the plurality of first entities.

In some embodiments, reducing the dimensionality of the numerical representations of the second entities comprises performing principal component analysis on a first data set comprising the numerical representations of the second entities, thereby determining a plurality of intermediate numerical representations of the second entities.

In some embodiments, each intermediate numerical representation corresponds with a respective numerical representation.

In some embodiments, reducing the dimensionality of the numerical representations of the second entities comprises performing Uniform Manifold Approximation and Projection on an intermediate data set comprising the intermediate numerical representations of the second entities, thereby determining the plurality of reduced dimensionality numerical representations.

In some embodiments, each reduced dimensionality numerical representation corresponds with a respective intermediate numerical representation.

In some embodiments, the method further comprises providing an indication of the specialisation of one or more of the plurality of first entities.

In some embodiments, providing the indication comprises displaying a visual representation of the specialisation function.

In some embodiments, the method further comprises providing a recommendation of a first entity to the candidate second entity based on the classification.

In some embodiments, classifying the candidate second entity comprises determining a matching score for one or more of the first entities, the matching score being indicative of a suitability of the relevant first entity to the candidate second entity.

In some embodiments, the matching score is indicative of a suitability of the candidate second entity to the relevant first entity.

In some embodiments, the matching score is based on the comparison of the reduced dimensionality numerical representation of the candidate second entity to the specialisation of each of the plurality of first entities.

In some embodiments, the matching scores are each related to a distance between the reduced dimensionality numerical representation of the candidate second entity and the relevant specialisation numerical representation.

In some embodiments, the recommendation is determined based on the matching scores.

Some embodiments relate to a computer-readable storage medium storing instructions that, when executed by a computer, cause the computer to perform the method previously described.

Some embodiments relate to a system comprising: at least one processor; and a memory storing program instructions accessible by the at least one processor, and configured to cause the at least one processor to: determine a numerical representation of each of a plurality of second entities, each numerical representation comprising a multi-dimensional vector characteristic of the respective second entity, wherein each second entity is associated with one or more first entities; reduce the dimensionality of the numerical representations to produce a plurality of reduced dimensionality numerical representations; and determine a specialisation of each of the plurality of first entities based on the respective reduced dimensionality numerical representations.

In some embodiments, the program instructions are further configured to cause the at least one processor to classify a candidate second entity to associate the candidate second entity with one of the first entities.

In some embodiments, classifying the candidate second entity comprises: determining a numerical representation of the candidate second entity; reducing the dimensionality of the numerical representation of the candidate second entity to produce a reduced dimensionality numerical representation of the candidate second entity; comparing the reduced dimensionality numerical representation of the candidate second entity to the specialisation of each of the plurality of first entities; and classifying the candidate second entity based on the comparison.

In some embodiments, determining the specialisation comprises determining a specialisation function of each of the plurality of first entities based on the respective reduced dimensionality numerical representations.

In some embodiments, determining the specialisation function comprises: centring a kernel function on each reduced dimensionality numerical representation of the second entities associated with the respective first entity; and summing the kernel functions, thereby determining the specialisation function.

In some embodiments, determining the specialisation comprises determining a specialisation numerical representation of each of the plurality of first entities.

In some embodiments, the specialisation numerical representation comprises one or more local maximum of the specialisation function.

In some embodiments, determining the specialisation of each of the plurality of first entities comprises a kernel density estimation.

In some embodiments, comparing the reduced dimensionality numerical representation of the candidate second entity to the specialisation of each of the plurality of first entities comprises comparing the reduced dimensionality numerical representation of the candidate second entity to the specialisation numerical representation of each of the plurality of first entities.

In some embodiments, reducing the dimensionality of the numerical representations of the second entities comprises performing principal component analysis on a first data set comprising the numerical representations of the second entities, thereby determining a plurality of intermediate numerical representations of the second entities.

In some embodiments, each intermediate numerical representation corresponds with a respective numerical representation.

In some embodiments, reducing the dimensionality of the numerical representations of the second entities comprises performing Uniform Manifold Approximation and Projection on an intermediate data set comprising the intermediate numerical representations of the second entities, thereby determining the plurality of reduced dimensionality numerical representations.

In some embodiments, each reduced dimensionality numerical representation corresponds with a respective intermediate numerical representation.

In some embodiments, the program instructions are further configured to cause the at least one processor to provide an indication of the specialisation of one or more of the plurality of first entities.

In some embodiments, providing the indication comprises generating and/or displaying a visual representation of the specialisation function.

In some embodiments, the program instructions are further configured to cause the at least one processor to generate and/or provide a recommendation of a first entity to the candidate second entity based on the classification.

In some embodiments, classifying the candidate second entity comprises determining a matching score for one or more of the first entities, the matching score being indicative of a suitability of the relevant first entity to the candidate second entity.

In some embodiments, the matching score is indicative of a suitability of the candidate second entity to the relevant first entity.

In some embodiments, the matching score is based on the comparison of the reduced dimensionality numerical representation of the candidate second entity to the specialisation of each of the plurality of first entities.

In some embodiments, the matching scores are each related to a distance between the reduced dimensionality numerical representation of the candidate second entity and the relevant specialisation numerical representation.

In some embodiments, the recommendation is determined based on the matching scores.

Some embodiments relate to a computer-implemented method, the method comprising: determining a numerical representation of each of a plurality of second entities, each numerical representation comprising a multi-dimensional vector characteristic of the respective second entity; reducing the dimensionality of the numerical representations to produce a plurality of reduced dimensionality numerical representations; and determining a region landscape function based on the plurality of reduced dimensionality numerical representations.

In some embodiments, the method further comprises generating a visual representation of the region landscape function.

In some embodiments, the method further comprises displaying the visual representation of the region landscape function.

In some embodiments, the second entities are each associated with a geographical region.

In some embodiments, determining the region landscape function comprises: centring a kernel function on each reduced dimensionality numerical representation; and summing the kernel functions to determine the region landscape function.

In some embodiments, the method further comprises determining a numerical representation of each of a plurality of second entities that are associated with a first entity, each numerical representation comprising a multi-dimensional vector characteristic of the respective second entity; reducing the dimensionality of the numerical representations of the plurality of second entities that are associated with the first entity to produce reduced dimensionality numerical representations of the plurality of second entities that are associated with the first entity; and determining a specialisation of the first entity based on the reduced dimensionality numerical representations of the plurality of second entities that are associated with the first entity.

In some embodiments, determining the specialisation of the first entity comprises determining a specialisation function of the first entity.

In some embodiments, determining the specialisation function comprises: centring a first entity kernel function on each reduced dimensionality numerical representation of the second entities associated with the first entity; and summing the first entity kernel functions, thereby determining the specialisation function of the first entity.

In some embodiments, determining the specialisation of the first entity comprises determining a specialisation numerical representation of the first entity.

In some embodiments, the specialisation numerical representation comprises one or more local maximum of the specialisation function.

In some embodiments, the method further comprises determining a comparison function by subtracting the specialisation function from the region landscape function.

In some embodiments, the method further comprises determining a first region of the comparison function where a magnitude of the comparison function is below a first comparison function magnitude threshold.

In some embodiments, the method further comprises comparing the numerical representations of the second entities with reduced dimensionality numerical representations that are within the first region to determine a similar feature of the numerical representations of the second entities with reduced dimensionality numerical representations that are within the first region.

In some embodiments, the method further comprises determining a second region of the comparison function, where the magnitude of the comparison function is below a second comparison function magnitude threshold.

In some embodiments, the method further comprises comparing the numerical representations of the second entities with reduced dimensionality numerical representations that are within the second region to determine a second similar feature of the numerical representations of the second entities with reduced dimensionality numerical representations that are within the second region.

Some embodiments relate to a system comprising: at least one processor; and a memory storing program instructions accessible by the at least one processor, and configured to cause the at least one processor to perform the method of the claims.

BRIEF DESCRIPTION OF DRAWINGS

Embodiments of the present disclosure will now be described by way of non-limiting example only with reference to the accompanying drawings, in which:

FIG. 5 is a process flow diagram of a method of reducing the dimensionality of data;

FIG. 13 illustrates the heat map visual representation of FIG. 11, the first entity visual representation of FIG. 12 and a comparison visual representation depicting a comparison function determined by subtracting the specialisation function of the respective first entity illustrated in FIG. 12 from the specialisation function of the region illustrated in FIG. 11.

DESCRIPTION OF EMBODIMENTS

Determining Entity Characteristics Overview

Figure 1:
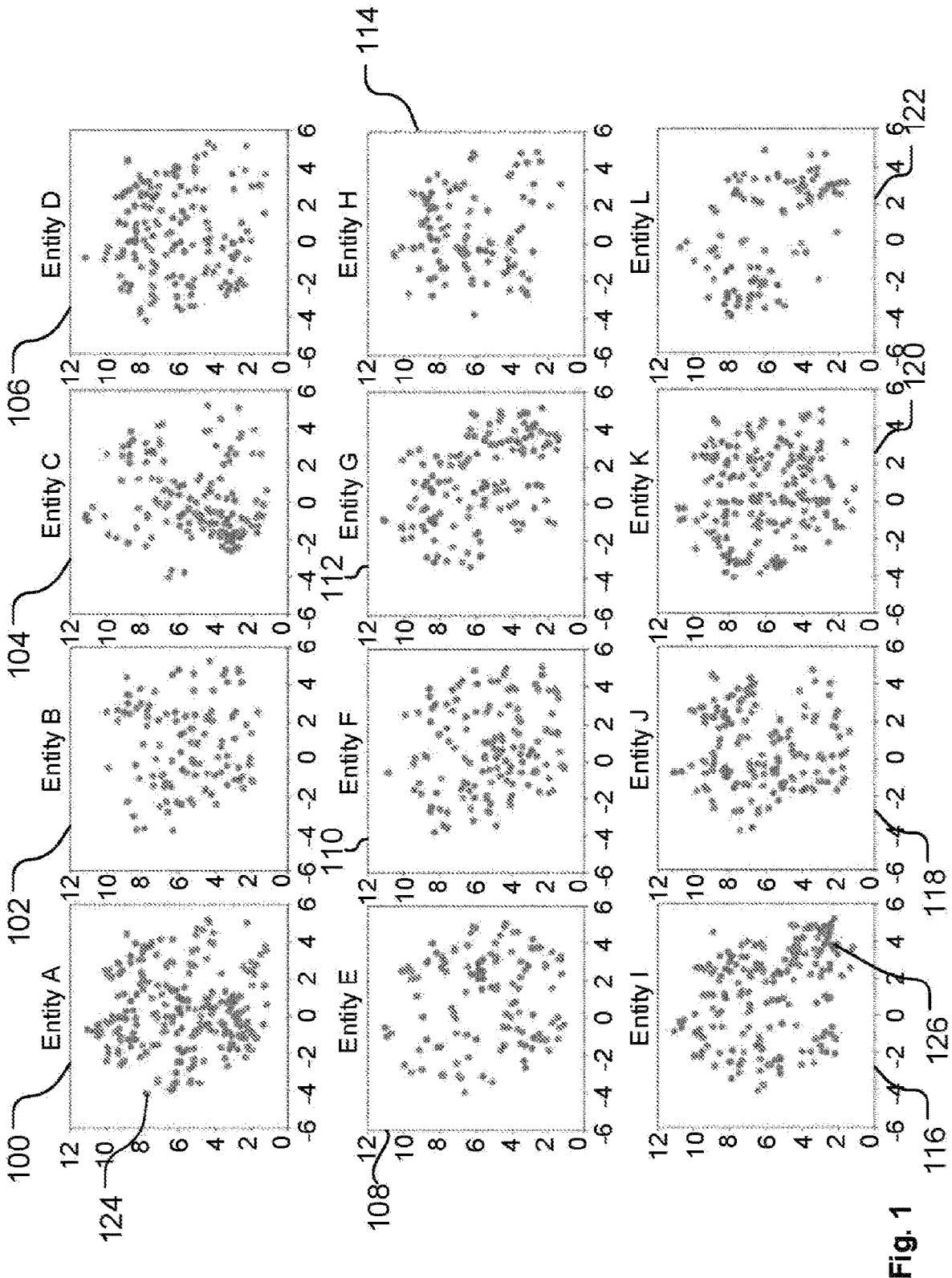
FIG. 1 illustrates a plurality of example scatter plot visual representations, each depicting reduced dimensionality numerical representations of second entities that are associated with a respective first entity (entities A to L)

Described embodiments relate to systems, computer-implemented methods, non-transitory computer-readable storage medium, and computer programs for determining entity characteristics. Some embodiments relate to determining characteristic representations or "fingerprints" of first entities based on a proximity of a plurality of reduced dimensionality numerical representations of second entities associated with the first entity. Some embodiments relate to producing visual representations of the characteristic representations or "fingerprints". Some embodiments relate to providing first entity recommendations to users based on a comparison of a numerical representation of the user with the characteristic representations or "fingerprints" of a plurality of first entities. The numerical representations may for example comprise multi-dimensional vectors, such as 2412-dimensional vectors.

The second entities may be customers or clients of the first entity, which may be a service provider, for example. A first data set comprises a plurality of numerical representations of second entities associated with the first entity as may, for example, be derived from information scraped from websites of the second entities. The numerical representations of the second entities are subjected to a dimensionality reduction process to produce a second data set comprising reduced dimensionality numerical representations of each of the second entities. The second data set is a characteristic representation or "fingerprint" of the first entity associated with each of the second entities whose reduced dimensionality numerical representations make up the second data set. The dimensionality reduction process effectively compresses the information of the numerical representations to fewer dimensions. The reduced dimensionality numerical representations of second entities that share one or more similarities may be closer together in a reduced space spanning the reduced dimensionality numerical representations, than those of second entities that do not share one or more similarities. For example, the reduced dimensionality numerical representations of second entities that are of the same industry may be closer together in the reduced space than the reduced dimensionality numerical representations of second entities that are of different industries.

Reducing the dimensionality of the numerical representations facilitates interpretation and visualisation of particular traits or aspects of each first entity. In some embodiments, the dimensionality reduction process comprises performing principal components analysis (PCA) on each of the numerical representations to produce a group of numerical representations of reduced dimensionality and performing uniform manifold approximation (UMAP) on the group to produce the second data set. For example, PCA may reduce the dimensionality of each numerical representation from a 2412-dimensional vector to a 50-dimensional vector, and UMAP may further reduce numerical representation to a two-dimensional vector.

A visual representation may then be generated from the second data set of reduced dimensionality numerical representations of each of the second entities and displayed on a user interface to provide a visual representation of aspects of the first entities. For example, the reduced dimensionality numerical representations of each of the second entities associated with a particular first entity may be displayed to provide a visual representation of aspects of that first entity. In some embodiments, the visual representation comprises a scatter plot. In some embodiments, the visual representation comprises a contour plot. In some embodiments, the visual representation comprises a heat map. For example, the heat map may be plotted using Gaussian kernel density estimation (KDE). The heat map may highlight areas of high density ("peaks") and low density ("troughs") more clearly and better approximate the information about the first entities.

In some embodiments, user requests for entities having specific traits or specialisations can be responded to by providing automated recommendations based on a reduced dimensionality numerical representation of the user. For example, a nearest neighbour classifier may be applied to the "peaks" of the heat map to determine suitable recommendations. In some embodiments, numerical representations of new entities can be processed to classify the new entity. Classifying the new entity can comprise associating the new entity with one of the first entities. The new entity may be referred to as a candidate second entity.

The visual representation generated according to the described embodiments facilitates the ease of interpretation of the numerical representations associated with each first entity, but is also numerically well-founded. This means the visual representation for one first entity is relatively easily qualitatively and quantitatively comparable with the visual representations of other first entities. Furthermore, this method for obtaining a distribution of second entities of a first entity is non-parametric and is flexible. The flexibility arises, at least in part, due to the method enabling new entities (e.g. the candidate second entity) to be mapped to the second data set such that inferences about the new entities can be made without requiring re-computation of the second data set due to the introduction of the new entities.

FIG. 1 illustrates a plurality of exemplary visual representations 100, 102, 104, 106, 108, 110, 112, 114, 116, 118, 120, 122 corresponding to a plurality of exemplary first entities (entities A through L), which may be determined according to some described embodiments. The visual representations 100, 102, 104, 106, 108, 110, 112, 114, 116, 118, 120, 122 are in the form of two-dimensional representations. In particular, the visual representations 100, 102, 104, 106, 108, 110, 112, 114, 116, 118, 120, 122 are in the form of scatter plots. Each visual representation 100, 102, 104, 106, 108, 110, 112, 114, 116, 118, 120, 122 represents the reduced dimensionality numerical representations of the second entities associated with a particular first entity. Each reduced dimensionality numerical representation is represented by a point 124. The visual representations 100, 102, 104, 106, 108, 110, 112, 114, 116, 118, 120, 122 may be provided or presented on a user interface for viewing by a user.

Presenting the visual representations 100, 102, 104, 106, 108, 110, 112, 114, 116, 118, 120, 122 can provide the user with useful insight into patterns that are present in the second data set (i.e. the plurality of reduced dimensionality numerical representations of the second entities associated with the first entity). These patterns may be difficult or impossible to discern if one were using the higher dimensional data.

Clusters 126 of points 124 can indicate inherent similarities between the second entities to which the points 124 correspond. For example, clusters 126 of points 124 can indicate that the second entities that correspond to those points 124 may be of a common class (e.g. a business industry, annual turnover, location etc.). These clusters 126 can therefore be used to determine specialisations of each first entity.

For the purposes of this disclosure, a specialisation of a first entity is considered to represent a similarity between second entities that are associated with that first entity. That is, some of the second entities that are associated with that first entity may be associated with a common class. For example, where a plurality of second entities that are associated with the first entity operate within a common business industry (a similarity), that business industry may be considered a specialisation of the first entity. Similarly, where a plurality of second entities that are associated with the first entity have one or more other common characteristics (e.g. industry, location, turnover, size, work type, and business type etc.), those common characteristics may be considered a similarity of the first entity. Similarly, those common characteristics may be considered a specialisation of the first entity. The relevant specialisations are determined as is disclosed herein.

Figure 2:
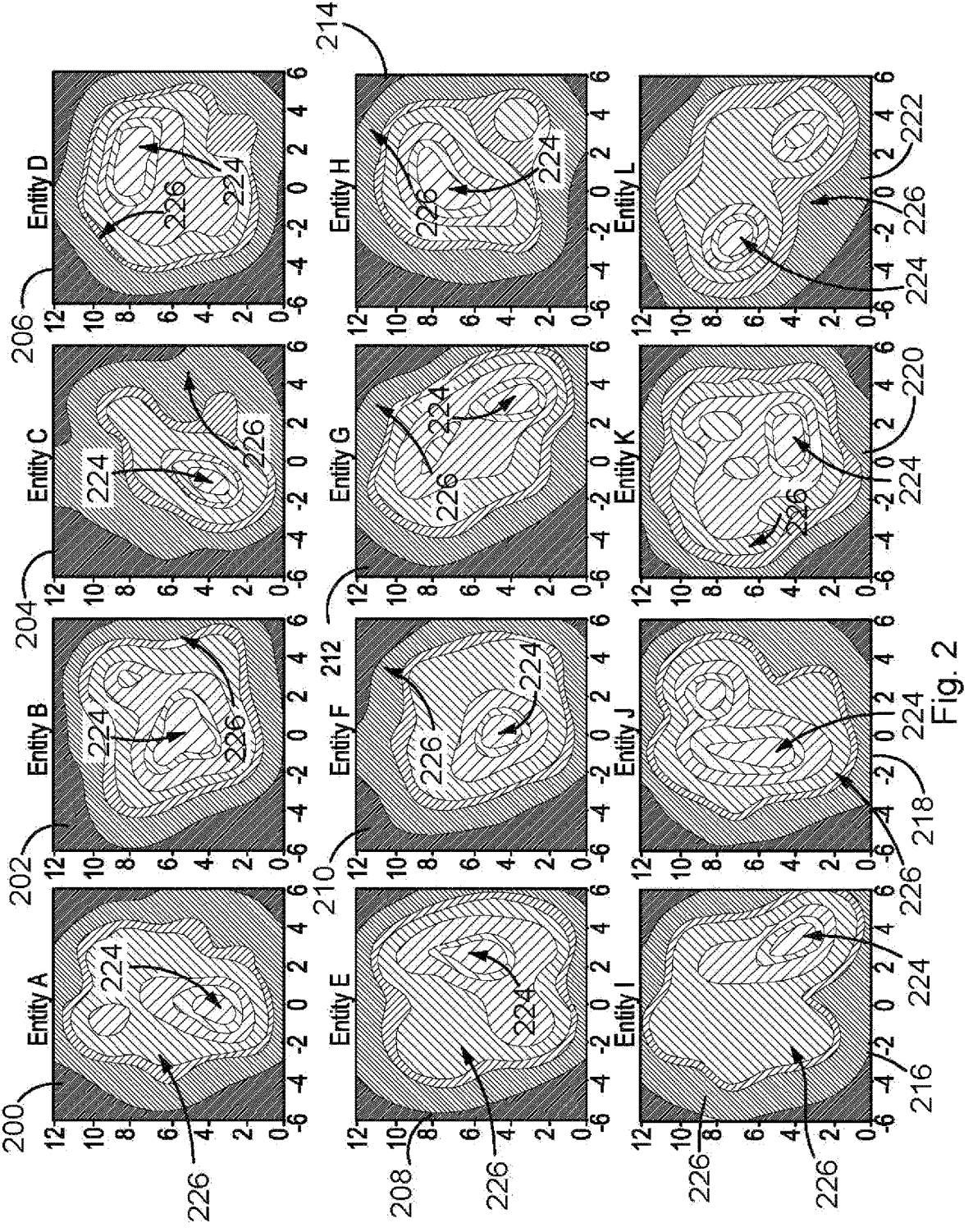
FIG. 2 illustrates a plurality of example "fingerprint" visual representations, each depicting the specialisation function of a respective first entity (entities A to L), according to some embodiments.

FIG. 2 illustrates a plurality of alternative visual representations 200, 202, 204, 206, 208, 210, 212, 214, 216, 218, 220, 222 corresponding to the plurality of first entities (entities A through L), which may be determined according to some described embodiments. The visual representations 200, 202, 204, 206, 208, 210, 212, 214, 216, 218, 220, 222 are in the form of two-dimensional representations. In particular, the visual representations 200, 202, 204, 206, 208, 210, 212, 214, 216, 218, 220, 222 are in the form of heat maps. The visual representations 200, 202, 204, 206, 208, 210, 212, 214, 216, 218, 220, 222 depict areas 224 with a relatively high density of points 124 (i.e. the clusters 126) and areas 226 with relatively low density of points 124. The areas 224 with a relatively high density of points 124 are indicative of specialisations of the respective first entities (i.e. areas of high market share of the relevant first entity). The areas 226 with a relatively low density of points 124 are indicative of areas of low market share. While illustrated in the form of heat maps, it will be understood that in some embodiments, the visual representations 200, 202, 204, 206, 208, 210, 212, 214, 216, 218, 220, 222 may comprise another two-dimensional illustration of three-dimensional data, such as a contour plot.

Each visual representation 200, 202, 204, 206, 208, 210, 212, 214, 216, 218, 220, 222 represents the reduced dimensionality numerical representations of the second entities associated with a particular first entity. The visual representations 200, 202, 204, 206, 208, 210, 212, 214, 216, 218, 220, 222 are produced by centring a kernel function on each of the relevant reduced dimensionality numerical representations (represented by the points 124 of FIG. 1), and summing the kernel functions to determine a specialisation function of each first entity, as will be described in more detail below. The magnitude of the specialisation function is represented by a corresponding colour, thereby producing the heat maps. The magnitude of the specialisation functions is greater at the clusters 126 described with reference to FIG. 1.

As the reduced dimensionality numerical representations of second entities that share one or more similarities are closer together in the reduced space spanning the reduced dimensionality numerical representations (and illustrated by the visual representations), than those of second entities that do not share one or more similarities, the clusters 126 can be used to determine the specialisation of a respective first entity, and make recommendations accordingly. For example, the most common industry of the second entities represented by the reduced dimensionality numerical representations of each cluster may be attributed to the first entity as a specialisation. A candidate second entity that operates in the industry of the specialisation may be recommended to engage the services of the first entity with the corresponding specialisation.

System Overview

Figure 3:
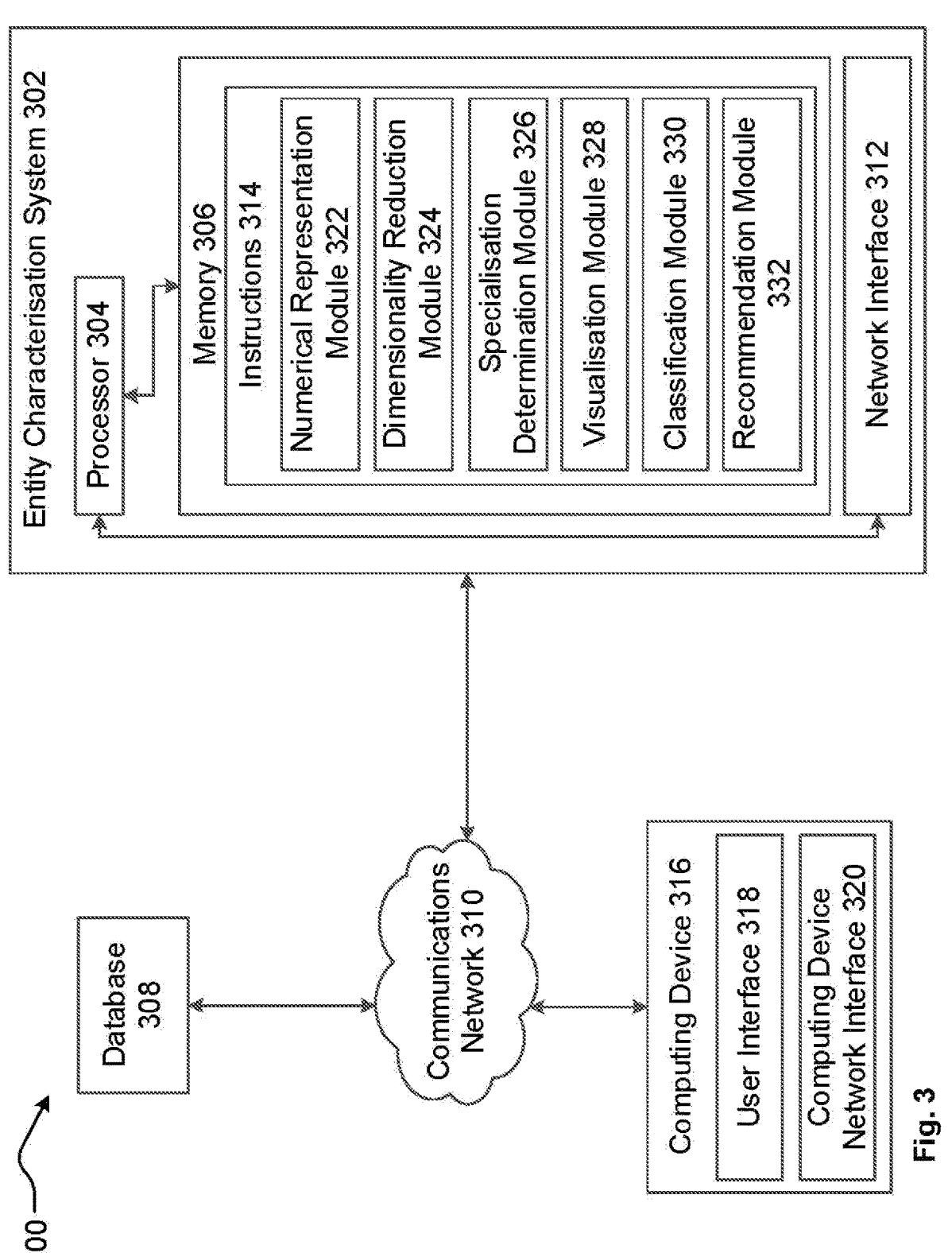
FIG. 3 is a block diagram of a system for determining entity characteristics according to some embodiments.

FIG. 3 illustrates an exemplary system 300 for determining entity characteristics according to some embodiments. The system 300 comprises an entity characterisation system 302. The entity characterisation system 302 comprises one or more processor(s) 304 and memory 306. The entity characterisation system 302 is configured to be in communication with a database 308. For example, as illustrated, the entity characterisation system 302 is configured to be in communication with the database 308 over a communications network 310.

The entity characterisation system 302 comprises a network interface 312. The network interface 312 allows the entity characterisation system 302 to communicate with the database 308 over the communications network 310. The network interface 312 may comprise a combination of network interface hardware and network interface software suitable for establishing, maintaining and facilitating communication over a relevant communication channel. Examples of a suitable communications network 310 include a cloud server network, wired or wireless internet connection, Bluetooth™ or other near field radio communication, and/or physical media such as USB. In some embodiments, the entity characterisation system 302 may comprise the database 308.

The one or more processor(s) 304 are configured to execute instructions 314 stored in memory 306 to cause the system 300 to function according to the described methods. In some embodiments, the instructions 314 are in the form of instruction program code. The one or more processor(s) 304 may comprise one or more microprocessors, central processing units (CPUs), application specific instruction set processors (ASIPs), application specific integrated circuits (ASICs) or other processors capable of reading and executing instruction code.

Memory 306 may comprise one or more volatile or non-volatile memory types. For example, memory 306 may comprise one or more of random access memory (RAM), read-only memory (ROM), electrically erasable programmable read-only memory (EEPROM) or flash memory. Memory 306 is configured to store program code accessible by the one or more processor(s) 304. The program code comprises executable program code modules. In other words, memory 306 is configured to store executable code modules configured to be executable by the one or more processor(s) 304. The executable code modules, when executed by the one or more processor(s) 304 cause the entity characterisation system 302 to perform certain functionality, as described in more detail below.

The system 300 may comprise a computing device 316 as illustrated in FIG. 3. The computing device 316 comprises a user interface 318 whereby one or more user(s) can submit requests to the computing device 316, and whereby the computing device 316 can provide outputs to the user. The user interface 318 may comprise one or more user interface components, such as one or more of a display device, a touch screen display, a keyboard, a mouse, a camera, a microphone, buttons, switches and lights.

The computing device 316 also comprises a computing device network interface 320. The entity characterisation system 302 is configured to be in communication with the computing device 316 over the communications network 310. The computing device network interface 320 allows the entity characterisation system 302 to communicate with the computing device 316 over the communications network 310. The computing device network interface 320 may comprise a combination of network interface hardware and network interface software suitable for establishing, maintaining and facilitating communication over a relevant communication channel. In some embodiments, the entity characterisation system 302 may comprise the user interface 318.

As illustrated in FIG. 3, memory 306 comprises an entity or numerical representation module 322 configured to determine a numerical representation of each of a plurality of second entities. The entity representation module 322 may be configured to determine information about one or more of the second entities by scraping databases associated with the second entities, interrogating databases storing information about the second entities and/or requesting data from suitable and in some cases, verified sources, for example. The entity representation module 322 may be configured to generate a numerical representation or a multi-dimensional vector representation of the second entity based on the determined information about the second entity. In some embodiments, the entity representation module 322 is configured to generate numerical representations for entities according to methods described in Australian Provisional Patent Application 2020901198 filed on 15 Apr. 2020, or International Patent Application PCT/NZ2021/050063 filed on 14 Apr. 2021, the content of both of which is incorporated herein by reference.

The numerical representations may for example comprise multi-dimensional vectors, such as 2412-dimensional vectors. That is, the numerical representation of a respective second entity may be in the form of a multi-dimensional vector. Each numerical representation and/or multi-dimensional vector may comprise and/or be associated with a second entity label. The second entity label may indicate the second entity to which the numerical representation and/or multi-dimensional vector corresponds. Each numerical representation and/or multi-dimensional vector may also comprise a first entity label. As each second entity is associated with a first entity, the first entity label may indicate the first entity associated with the second entity to which the numerical representation and/or multi-dimensional vector corresponds. A first data set may comprise the numerical representations and/or multi-dimensional vectors of the plurality of second entities.

Memory 306 further comprises dimensionality reduction module 324 configured to reduce the dimensionality of the numerical representations of the second entities. In some embodiments, the dimensionality reduction module 324 is configured to receive the first data set. In some embodiments, the dimensionality reduction module 324 is configured to receive one or more of the numerical representations. The dimensionality reduction module 324 may receive the first data set and/or the numerical representations from the numerical representation module 322, or from a source external to the entity characterisation system 302, for example.

The dimensionality reduction module 324 is configured to reduce the dimensionality of the numerical representations to produce reduced dimensionality numerical representations. The reduced dimensionality numerical representations may for example comprise multi-dimensional vectors, such as 2-dimensional vectors. That is, the reduced dimensionality numerical representation of a respective second entity may be in the form of a multi-dimensional vector. Each reduced dimensionality numerical representation may comprise and/or be associated with a second entity label. The second entity label may indicate the second entity to which the reduced dimensionality numerical representation corresponds. Each reduced dimensionality numerical representation may also comprise a first entity label. As each second entity is associated with a first entity, the first entity label may indicate the first entity associated with the second entity to which the reduced dimensionality numerical representation corresponds. A second data set may comprise the reduced dimensionality numerical representations of the plurality of second entities.

In some embodiments, the dimensionality reduction module 324 is configured to determine the second data set from the first data set, or to transform the first data set into the second data set, the second data set being of reduced dimensionality with respect to the first data set. In some embodiments, the dimensionality reduction module 324 is configured to reduce the dimensions of the one or more numerical representations of the entities to produce the second data set comprising one or more of the reduced dimensionality numerical representations of the second entities. Reducing the dimensionality of the numerical representations can advantageously reduce noise associated with the numerical representations. That is, less significant features of the numerical representations can be removed or excluded from consideration to produce the reduced dimensionality numerical representations.

In some embodiments, the dimensionality reduction module 324 is configured to perform a first dimensionality reduction process on the first data set to produce a third or intermediate data set having reduced dimensionality with respect to the first data set. The dimensionality reduction module 324 is also configured to perform a second dimensionality reduction process on the intermediate data set to produce the second data set.

In some embodiments, the dimensionality reduction module 324 is configured to determine a first transformation. The first transformation is configured to transform n-dimensional data associated with the numerical representations of the second entities into m-dimensional data associated with the numerical representations of the intermediate or third data set. The first transformation may be a linear transformation. The first transformation may be an orthogonal transformation. The first transformation may be a relatively coarse transformation, and may for example, reduce a 2412-dimensional data set to a 50-dimensional data set.

In some embodiments, the dimensionality reduction module 324 is configured to determine a second transformation. The second transformation is configured to transform m-dimensional data associated with the numerical representations of the intermediate or third data set into p-dimensional data comprising the reduced dimensionality numerical representations of the second entities. The second transformation may be a non-linear transformation. The second transformation may be a linear transformation. The second transformation may be an orthogonal transformation. The second transformation may be a relatively fine transformation, and may for example, reduce a 50-dimensional data set to a 2-dimensional data set.

In some embodiments, the dimensionality reduction module 324 uses PCA to determine the intermediate data set and/or first transformation. Principal component analysis is a method of reducing the dimensionality of data comprising a relatively large number of features. PCA linearly maps input data to lower dimensional output data. In particular, PCA linearly maps the input data to a lower dimensional space whilst maximizing the variance of the output data in the lower dimensional space. PCA can be used to retain a significant portion of the variance of the input data whilst reducing the dimensionality, as will be described in more detail below. This advantageously retains important characteristics of the input data whilst reducing the memory required to store the input data after its dimensionality is reduced. Furthermore, reduced computational resources are required to process the lower-dimensional output data, and computations are faster to perform relative to processing the input data. In some embodiments, the intermediate data set, and/or the first transformation is determined using another linear projection technique.

In some embodiments, the dimensionality reduction module 324 uses Uniform Manifold Approximation and Projection (UMAP) to determine the second data set based on the intermediate data set, or to determine the second transformation. Use of UMAP provides advantages over other dimensionality reduction methods, as UMAP allows for the determination of the second transformation. Other dimensionality reduction techniques (such as t-distributed stochastic neighbour embedding (t-SNE)) may not allow for the determination of the second transformation. That is, using other dimensionality reduction techniques, such as t-SNE, each time new data is added to the data set under analysis, in this case, the intermediate data set, the entirety of the second data set needs to be recomputed. Advantageously, UMAP allows for the determination of the second transformation, which may be used to transform new data of the dimensionality of the intermediate data set into the lower-dimensional space of the second data set. In some embodiments, the second data set is determined based on the intermediate data set using t-SNE. In some embodiments, the second data set and/or the second transformation is determined based on the intermediate data set using another non-linear projection technique.

Memory 306 further comprises a specialisation determination module 326. The specialisation determination module 326 is configured to determine the specialisation of each of the first entities based on the reduced dimensionality numerical representations of the second entities associated with the respective first entity. In some embodiments, the specialisation determination module 326 is configured to centre a kernel function on each of the reduced dimensionality numerical representations (or vectors) of the second data set associated with the respective first entity. The specialisation determination module 326 is configured to sum the kernel functions to determine the specialisation of the first entity, as will be described in more detail below.

Memory 306 may comprise a visualisation module 328 configured to produce visual representations of the reduced dimensionality numerical representations like those described with reference to FIG. 1 and FIG. 2. That is, the visualisation module 328 may be configured to produce visual representations of some or all of the second data set. The visual representations may be in the form of scatter plots or heat maps, for example.

Memory 306 comprises a classification module 330 configured to classify a candidate second entity, such as a customer seeking to find a first entity (service provider) that specialises in servicing similar customers to the candidate second entity. Classifying the candidate second entity may comprise associating the candidate second entity with one or more of the first entities. Associating the candidate second entity with one or more of the first entities may comprise tagging or labelling a numerical representation of the candidate second entity with a label corresponding to the relevant first entity. In some embodiments, the classification module 330 may use a nearest-neighbour classifier, as will be described in more detail below.

Memory 306 comprises a recommendation module 332 configured to generate and/or provide a recommendation that the first entity that is associated with the candidate second entity by the classification module 330 is suitable for the candidate second entity. In some embodiments, the recommendation module 332 is configured to generate a recommendation object comprising the recommendation, and make the recommendation object accessible, as will be described in more detail below.

Determining Entity Characteristics According to Method 400

Figure 4:
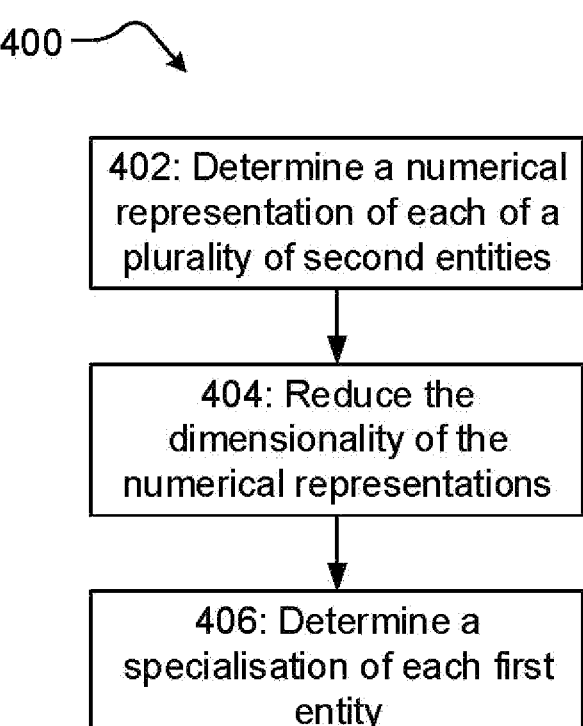
FIG. 4 is a process flow diagram of a method of determining entity characteristics according to some embodiments.

Referring now to FIG. 4, there is shown a process flow diagram of a computer-implemented method 400 for determining entity characteristics, according to some embodiments. In some embodiments, the method 400 is performed by the entity characterisation system 302 illustrated in FIG. 3. For example, the one or more processors 304 may be configured to execute instructions 314 stored in memory 306 to cause the entity characterisation system 302 to perform some or all of the method 400.

At 402, the numerical representation module 322 determines a numerical representation of each of a plurality of second entities. This may comprise determining the first data set. The numerical representation module 332 may determine the numerical representations of the second entities. Each numerical representation is associated with a respective second entity, which is itself associated with a respective first entity, as previously described.

The numerical representation module 322 may determine the numerical representations from the database 308. For example, the numerical representations of each of the plurality of second entities may be stored in the database 308. The entity characterisation system 302 may retrieve the numerical representations from the database 308, thereby determining the numerical representations. In some embodiments, the entity characterisation system 302 may determine the numerical representations as described in Australian provisional patent application 2020901198 filed on 15 Apr. 2020, the contents of which are incorporated herein by reference. The entity characterisation system 302 may store the numerical representations in the memory 306. The numerical representations may be stored in the form of the first data set.

At 404, the entity characterisation system 302 reduces the dimensionality of the numerical representations to produce a plurality of reduced dimensionality numerical representations. In some embodiments, the dimensionality reduction module 324 may reduce the dimensionality of the numerical representations to produce the intermediate numerical representations. Each reduced dimensionality numerical representation corresponds to a respective numerical representation.

The numerical representation module 322 may perform two dimensionality reduction operations on the numerical representations to produce the reduced dimensionality numerical representations. The numerical representation module 322 may reduce the dimensionality of the numerical representations to produce intermediate numerical representations. This is the first dimensionality reduction operation of the two dimensionality reduction operations performed by the entity characterisation system 302. The intermediate numerical representations may be in the form of an intermediate data set. That is, an intermediate data set may comprise the intermediate numerical representations. In some embodiments, the numerical representation module 322 may perform a relatively coarse transformation to transform or convert the dimensionality of the numerical representations to produce coarsely reduced dimensionality numerical representations, which may form the intermediate data set.

Each intermediate numerical representation is associated with a corresponding numerical representation. The entity characterisation system 302 stores the intermediate numerical representations in the memory 306. Once the intermediate numerical representations have been determined, the entity characterisation system 302 may discard the stored numerical representations of the first data set. In some embodiments, the numerical representations are 2412-dimensional, and the intermediate numerical representations are 50-dimensional. As the intermediate numerical representations are lower-dimensional data than the numerical representations of the first data set, storing the intermediate numerical representations in the memory 306 and discarding the numerical representations from the memory 306 advantageously frees storage capacity of the memory 306.

The entity characterisation system 302 also determines a first transformation. In some embodiments, the dimensionality reduction module 324 may determine the first transformation. The first transformation is configured to transform input data of the same dimensionality as the numerical representations into output data of the same dimensionality as the intermediate numerical representations. The entity characterisation system 302 stores the first transformation in the memory 306.

The dimensionality reduction module 324 may perform a principal component analysis using the numerical representations as input data to reduce the dimensionality of the numerical representations. In some embodiments, PCA using singular value decomposition (SVD) is implemented to reduce the dimensionality of the numerical representations. In some embodiments, PCA using SVD may be implemented as described below with reference to FIG. 5 and method 600. In some embodiments, PCA using eigenvalue decomposition is implemented to determine the intermediate data set using the first data set. In performing the PCA, the entity characterisation system 302 may also determine the first transformation, as described below.

The dimensionality reduction module 324 may also reduce the dimensionality of the intermediate numerical representations to produce the reduced dimensionality numerical representations of the second data set. This is the second dimensionality reduction operation of the two dimensionality reduction operations performed by the entity characterisation system 302. Each reduced dimensionality numerical representation corresponds to a respective intermediate numerical representation. In some embodiments, the numerical representation module 322 may perform a relatively fine transformation to transform or convert the dimensionality of the relatively coarsely reduced dimensionality numerical representations (of the intermediate data set) to produce relatively finely reduced dimensionality numerical representations, which may form the second data set.

Each reduced dimensionality numerical representation also corresponds to a respective numerical representation. The dimensionality reduction module 324 may reduce the dimensionality of the intermediate numerical representations to produce the further reduced dimensionality numerical representations. The entity characterisation system 302 stores the further reduced dimensionality numerical representations in the memory 306. Once the further reduced dimensionality numerical representations have been determined, the entity characterisation system 302 may discard the stored intermediate numerical representations. In some embodiments, the reduced dimensionality numerical representations are 2-dimensional. As the reduced dimensionality numerical representations are lower dimensional data than the intermediate numerical representations, storing the reduced dimensionality numerical representations in the memory 306 and discarding the intermediate numerical representations from the memory 306 advantageously frees storage capacity of the memory 306.

The entity characterisation system 302 determines a second transformation. In some embodiments, the dimensionality reduction module 324 may determine the second transformation. The second transformation is configured to transform input data of the same dimensionality as the intermediate numerical representations into output data of the same dimensionality as the reduced dimensionality numerical representations. The entity characterisation system 302 stores the second transformation in the memory 306.

The dimensionality reduction module 324 may perform UMAP using the intermediate numerical representations as input data to produce the reduced dimensionality numerical representations. The entity characterisation system 302 may perform UMAP as described in "UMAP: Uniform Manifold Approximation and Projection for Dimension Reduction" by Leland McInnes and John Healy (2018). In some embodiments, the entity characterisation system 302 may execute a UMAP library and/or code as available at https://github-.com/lmcinnes/umap/blob/master/doc/index.rst. In performing UMAP, the entity characterisation system 302 may also determine the second transformation.

In some embodiments, the dimensionality reduction module 324 may perform t-SNE using the intermediate numerical representations and input data to produce the reduced dimensionality numerical representations. The entity characterisation system 302 may perform t-SNE as described in "Visualizing data using t-SNE" by Laurens van der Maaten and Geoffrey Hinton (2008).

As the first data set comprises the numerical representations, it can be said that the dimensionality reduction module 324 reduces the dimensionality of the first data set. The first data set comprises a plurality of first vectors. Each first vector comprises a respective numerical representation. Each numerical representation may comprise a plurality of numerical representation features. Thus, each first vector may comprise a plurality of first vector features, the first vector features corresponding to the numerical representation features. Each numerical representation may comprise an identifier of a numerical representation class. The numerical representation class may be indicative of an industrial category associated with each numerical representation, and therefore each second entity represented by the numerical representation. For example, the identifier may indicate that the second entity is a sole trading entity, or that it is a tech savvy entity. Each numerical representation may comprise a second identifier indicating the first entity associated with the second entity that is represented by the numerical representation. In some embodiments, the second identifier is a label appended to the numerical representation. In some embodiments, the first data set is in the form of a first matrix. The first matrix may comprise each first vector (and therefore each numerical representation). In some embodiments, the numerical representations of the second entities are at least part of the rows of the first matrix. The identifier and the second identifier associated with each numerical representation may also form part of each of the respective rows of the first matrix.

The first data set, and thus each of the numerical representations can be n-dimensional data. That is, the numerical representations can each comprise n numerical representation features. Therefore, a first space of n dimensions can comprise the first data set and/or the numerical representations. In some embodiments, the first data set is 2412-dimensional. Therefore, as previously described, each numerical representation is 2412-dimensional. In some embodiments, the first data set, and therefore each numerical representation can have a dimensionality of between 50 and 10000 dimensions.

The entity characterisation system 302 reduces the dimensionality of the first data set to produce the intermediate data set. The entity characterisation system 302 may perform a principal component analysis using the first data set (comprising the numerical representations) as input data to reduce the dimensionality of the first data set, as previously described.

As previously described, the intermediate data set comprises the intermediate numerical representations. Each intermediate numerical representation may be in the form of an intermediate vector. Thus, the intermediate data set comprises a plurality of intermediate vectors, with each intermediate vector comprising one of the intermediate numerical representations. Each intermediate numerical representation may comprise a plurality of intermediate numerical representation features. Thus, each intermediate vector may comprise a plurality of intermediate vector features, the intermediate vector features corresponding to the intermediate numerical representation features. Each intermediate numerical representation may comprise a label indicating the first entity associated with the intermediate numerical representation. In some embodiments, the label is appended to the intermediate numerical representation. In some embodiments, the intermediate data set is in the form of an intermediate matrix. The intermediate matrix may comprise each intermediate numerical representation. In some embodiments, the intermediate numerical representations are at least part of the rows of the intermediate matrix. The labels may also form part of each of the respective rows of the intermediate matrix.

The intermediate data set, and thus each of the intermediate numerical representations can be m-dimensional data. That is, the intermediate numerical representations can each comprise m intermediate numerical representation features. Therefore, an intermediate space of m dimensions can comprise the intermediate data set and/or the intermediate numerical representations. In some embodiments, the intermediate data set is 50-dimensional. Therefore, as previously described, each intermediate numerical representation is 50-dimensional. In some embodiments, the intermediate data set, and therefore each intermediate numerical representation can have a dimensionality of between 3 and 50 dimensions.

The dimensionality reduction module 324 reduces the dimensionality of the intermediate data set to produce a second data set (comprising the reduced dimensionality numerical representations). The entity characterisation system 302 may perform UMAP using the intermediate data set as input data to produce the second data set, as previously described.

As previously described, the second data set comprises the reduced dimensionality numerical representations. Each reduced dimensionality numerical representation corresponds with a respective numerical representation. Each reduced dimensionality numerical representation corresponds with a respective intermediate numerical representation. Each reduced dimensionality numerical representation may be in the form of a second vector. Thus, the second data set comprises a plurality of second vectors, with each second vector comprising one of the reduced dimensionality numerical representations. Each reduced dimensionality numerical representation may comprise a plurality of reduced dimensionality numerical representation features. For example, each reduced dimensionality numerical representation may comprise a first feature and a second feature. Thus, each second vector may comprise a plurality of second vector features, the second vector features corresponding to the reduced dimensionality numerical representation features. Each reduced dimensionality numerical representation may comprise a label indicating the first entity associated with the reduced dimensionality numerical representation. In some embodiments, the label is appended to the reduced dimensionality numerical representation. In some embodiments, the second data set is in the form of a second matrix. The second matrix may comprise each reduced dimensionality numerical representation. In some embodiments, the reduced dimensionality numerical representations are at least part of the rows of the second matrix. The labels may also form part of each of the respective rows of the second matrix.

The second data set, and thus each of the reduced dimensionality numerical representations can be p-dimensional data. That is, each reduced dimensionality numerical representation can comprise p features. Therefore, a second space of p dimensions can comprise the second data set and/or the second numerical representations. In some embodiments, the second data set is 2-dimensional. Therefore, as previously described, each reduced dimensionality numerical representation is 2-dimensional. In some embodiments, the second data set, and therefore each reduced dimensionality numerical representation can have a dimensionality of between 1 and 3 dimensions.

The second data set is a lower dimensional representation of the first data set, however, a significant portion of the structure of the first data set is retained in the second data set. As previously described, for example, the reduced dimensionality numerical representations of second entities that share one or more similarities may be closer together in the second space spanning the reduced dimensionality numerical representations, than those of second entities that do not share one or more similarities. Exploratory data analysis can therefore be performed on the second data to identify patterns that may be present in the second data. The results of such an exploratory data analysis can provide meaningful insight into the nature of the second data, the first data and therefore the first entities and second entities. Furthermore, in some embodiments, the first data can be discarded and the second data stored. For example, the entity characterisation system 302 may store the second data in memory 306 and discard the second data. This can significantly reduce the capacity requirements of memory 306.

Reducing the dimensionality of the numerical representations using multiple (e.g. two) dimensionality reduction operations as described may provide a number of advantages. The number of first entities being analysed can be relatively large and the number of second entities associated with the first entities can also be relatively large. Therefore, the number of numerical representations can be relatively large (e.g. over 100). Furthermore, the number of numerical representation features in each numerical representation can be relatively large (e.g. over 1000, such as 2412 features).

PCA is a computationally less-intensive algorithm than either of t-SNE or UMAP and preserves important structures in processed data. Performing t-SNE on a relatively large amount of high-dimensional data such as the numerical representations can therefore be computationally intensive and without significant computing capability, it can be outside what is feasible for many organisations. While UMAP scales significantly better than t-SNE, similar problems can be encountered when performing UMAP on a relatively large amount of high-dimensional data such as the numerical representations.

That said, other dimensionality reduction techniques such as t-SNE and UMAP can provide better separation of data with common features. For example, t-SNE and UMAP can provide better separation of dissimilar second entities when processing the intermediate numerical representations than may be provided by using PCA to reduce the dimensionality of the numerical representations down to two dimensions directly.

Reducing the dimensionality of the numerical representations using multiple dimensionality reduction operations as described enables the advantages of the different dimensionality reduction operations to be leveraged whilst limiting the impact of the disadvantages. For example, as PCA is computationally less-intensive and preserves the important structures in the processed data, performing a first dimensionality reduction operation (using PCA or another dimensionality reduction technique that is well-suited for reducing the dimensions of high-dimensional data) enables an initial reduction in the dimensionality of the numerical representations whilst retaining the important structure of the data. As t-SNE and UMAP can provide better separation of data with common features, processing the intermediate numerical representations using t-SNE or UMAP (or another suitable dimensionality reduction technique) can enable more meaningful specialisation functions to be determined. As a result, more meaningful inferences can be made about the first entities and the second entities, whilst reducing the computational resources required to determine those inferences relative to a case where t-SNE or UMAP was used directly on the numerical representations.

At 406, the entity characterisation system 302 determines a specialisation of each of the first entities. The entity characterisation system 302 determines the specialisation of a first entity based on the reduced dimensionality numerical representations (second data set) of the second entities that are associated with that first entity. In particular, the specialisation determination module 326 may determine the specialisation of each of the first entities.

As previously described, each first entity is associated with a plurality of second entities and each second entity is associated with a respective reduced dimensionality numerical representation. Each reduced dimensionality numerical representation represents its corresponding second entity in the p-dimensional space that spans the set of reduced dimensionality numerical representations. The specialisation determination module 326 determines the specialisation of a first entity by centring a kernel function on the reduced dimensionality numerical representations of the second entities associated with the respective first entity. In other words, as each numerical representation can be in the form of a second vector of the second data set, the specialisation determination module 326 may determine the specialisation of the first entity by centring the kernel function on each second vector representing each second entity associated with the respective first entity.

The kernel function is characterised by a global maximum at a kernel function origin. The kernel function is also characterised by a width that is associated with a decay in an amplitude of the kernel function as the kernel function extends away from the origin. The width may be indicative of a distance from the kernel function origin at which the amplitude of the kernel function is below an amplitude threshold. Alternatively, the width may be indicative of a distance from the kernel function origin at which the amplitude of the kernel function is zero.

Centring a kernel function on one of the reduced dimensionality numerical representations comprises setting the origin of the kernel function to be that reduced dimensionality numerical representation. That is, the kernel function is generated such that the kernel function origin corresponds with the reduced dimensionality numerical representation.

Centring a kernel function on each of the reduced dimensionality numerical representations can be considered to be associating a weight to that reduced dimensionality numerical representation. By centring a kernel function on each of the two-dimensional reduced dimensionality numerical representations, a three-dimensional map of the reduced dimensionality numerical representations can be generated that spans the two-dimensional space of the reduced dimensionality numerical representations, enabling inferences to be made regarding the reduced dimensionality numerical representations.

In some embodiments, the kernel function can be a uniform, triangular, biweight, triweight, Epanechnikov, normal, Gaussian, tophat, exponential, linear, cosine or other kernel function. In some embodiments, the kernel function is a multivariate kernel function. Each kernel function can be a p+1-dimensional kernel function of unit magnitude in the additional dimension.

The specialisation determination module 326 may determine a specialisation function for the first entity by summing the kernel functions. Thus, the specialisation determination module 326 may determine the specialisation function of the first entity, the specialisation function being the sum of the kernel functions centred on the reduced dimensionality numerical representations of the second entities associated with that first entity. The specialisation function is a p+1-dimensional function. For example, each specialisation function is a three-dimensional function when the reduced dimensionality numerical representations are two-dimensional. Each position in the second space can be an input of each specialisation function. An output of each specialisation function can comprise a magnitude of the specialisation function at that position. The magnitude is proportional to the density of nearby reduced dimensionality numerical representations in the second space. The specialisation function may be a probability density function.

In some embodiments, the specialisation determination module 326 determines the specialisation function for each first entity by performing kernel density estimation using the numerical representations of the second entities associated with the respective first entity. In some embodiments, the entity characterisation system 302 may execute a KDE library or code as available at https://docs.scipy.org/doc/scipy/reference/generated/scipy.stats.gaussian_kde.html.

The entity characterisation system 302 may determine one or more specialisation numerical representations of each first entity. Each specialisation numerical representation corresponds with a specialisation of the respective first entity.

In some embodiments, the entity characterisation system 302 determines a local maximum of each specialisation function. In some embodiments, the entity characterisation system 302 determines the local maximum of each specialisation function by executing a library or code as available at https://scikit-image.org/docs/dev/auto_examples/segmentation/plot_peak_local_max.html.

As previously described, the magnitude of the specialisation function at a position in the second space is proportional to the density of nearby reduced dimensionality numerical representations of second entities associated with the relevant first entity. Therefore, each local maximum of the specialisation function is indicative of a relatively high density of nearby reduced dimensionality numerical representations in the second space. Each local maximum may be considered to represent a specialisation of the first entity. Each local maximum can be referred to as a specialisation numerical representation, representing a specialisation of the associated first entity.

Each of the specialisation numerical representations associated with each first entity can be aggregated into a specialisation data set. The specialisation data set can therefore comprise each specialisation numerical representation. In some embodiments, the entity characterisation system 302 determines the specialisation of each first entity by determining the relevant specialisation numerical representations.

In some embodiments, the entity characterisation system 302 associates a class corresponding with the determined specialisation numerical representations to each first entity. For example, the entity characterisation system 302 can determine the most common class of the second entities represented by the reduced dimensionality numerical representations nearby the determined local maximum and/or specialisation numerical representation. The entity characterisation system 302 may, for example, determine the most common class of the second entities represented by the q reduced dimensionality numerical representations closest to the local maximum and/or specialisation numerical representation. The entity characterisation system 302 may associate the relevant first entity with this class. In some embodiments, the specialisation is the determined class. For example, where the most common class of the second entities represented by the reduced dimensionality numerical representations nearby the determined local maximum and/or specialisation numerical representation is construction, the relevant first entity may be associated with having a specialisation in the construction industry.

In some embodiments, only local maxima with a magnitude above a magnitude threshold are determined and stored as a specialisation numerical representation. That is, local maxima with a magnitude below the magnitude threshold are discarded, and not considered indicative of the specialisation of the respective first entity. This minimises the risk that the specialisation numerical representations misrepresent the specialisations of the relevant first entities. In some embodiments, the magnitude threshold is a fixed threshold.

In some embodiments, the magnitude threshold is a proportional threshold. For example, the magnitude threshold may be proportional to the maximum magnitude of the respective specialisation function.

In some embodiments, the specialisation data set and/or the specialisation numerical representations are stored in memory 306. The entity characterisation system 302 may discard the specialisation functions after storing the specialisation numerical representations. The specialisation data set and/or specialisation numerical representations comprise a significant amount of the important information derivable from the specialisation models. Storing the specialisation data set however requires significantly less memory than storing all of the relevant specialisation models. Thus, determining and storing the specialisation data set allows for the specialisation models to be discarded without significant loss of important information.

As previously mentioned, the specialisation data set comprises the plurality of specialisation numerical representations. Each specialisation numerical representation may be in the form of a specialisation numerical representation vector. The specialisation data set comprises the specialisation numerical representation vectors. Each specialisation numerical representation vector may comprise one or more specialisation numerical representation vector features. Each specialisation numerical representation may be labelled with one or more labels. For example, each specialisation numerical representation may be labelled with a label indicating the first entity associated with the relevant specialisation numerical representation. Each specialisation numerical representation vector may comprise the relevant specialisation numerical representation, and the associated label(s).

The specialisation data set may be r-dimensional data. In other words, each specialisation numerical representation vector may comprise r specialisation numerical representation vector features.

While determining the specialisations of each first entity as previously described can provide advantageous insight into possible areas of expertise the first entity holds a competitive advantage in, it can also allow identification of risks to the business. For example, if a first entity specialises in one industry, but does not have a particularly diverse range of client second entities of other industries, said first industry may be undesirably exposed to the industry of its specialisation. Therefore, the determined specialisations also provide an insight into other industries that the first entity is not currently heavily involved in, but may wish to target.

Reducing the Dimensionality of the Numerical Representations Using PCA

As previously described, a principal component analysis may be used to reduce the dimensionality of the numerical representations. In some embodiments, the entity characterisation system 302 may execute a PCA library and/or code available at: https://scikit-learn.org/stable/modules/generated/sklearm.decomposition.PCA.html to perform the PCA.

A process flow diagram of a computer-implemented method 500 of PCA using SVD according to some embodiments is shown in FIG. 5. The entity characterisation system 302 may execute the computer-implemented method 500 to reduce the dimensionality of the numerical representations (and therefore the first data set), thereby producing the intermediate numerical representations (and therefore the intermediate data set), as described at 404 of the method 400. The dimensionality reduction module 324 may perform the computer-implemented method 500.

At 502, the entity characterisation system 302 determines the first matrix A comprising the numerical representations. Alternatively, the first data set may be in the form of the first matrix A. The first matrix A may comprise each of the first vectors. For example, each first vector may define a row of the first matrix A.

At 504, the entity characterisation system 302 determines a mean of each feature of the first matrix A. The respective means can be aggregated into a mean vector M.

At 506, the entity characterisation system 302 determines a centred matrix B by centring the first matrix A. In some embodiments, to centre the first matrix A, the mean for each feature determined at 504 is subtracted from each feature at 506. That is;

$$B=A-M$$

At 508, the entity characterisation system 302 performs singular value decomposition on the centred matrix B. The SVD can provide principal components of the first data. The principal components are determined such that a first principal component has the largest possible variance, and each subsequent principal component also has the highest possible variance, with the additional constraint that it is orthogonal to the preceding principal components. The singular value decomposition of axb centred matrix B is a factorization of the form $U\Sigma V^T$ where U is an axa unitary matrix, $\Sigma$ is an axb rectangular diagonal matrix with non-negative real numbers on the diagonal, and V is an bxb unitary matrix. That is, the SVD of the centred matrix B can be represented:

$$B=U\Sigma V^T$$

The columns of unitary matrix V comprise the eigenvectors of $B^T B$. The columns of unitary matrix U comprise the eigenvectors of $BB^T$. The singular values of diagonal matrix $\Sigma$ (the values of the diagonals) are square roots of eigenvalues of $B^T B$ or $BB^T$ and are arranged in descending order.

At 510, the entity characterisation system 302 determines the first transformation using the SVD of the centred matrix B. The mean vector M and a subset of the principal components, being the eigenvectors determined by the SVD and stored in V, can be used to determine the first transformation. Using a subset of the principal components provides for the dimensionality reduction of the intermediate data set and/or the intermediate numerical representations with respect to the first data set and the numerical representations. The principal components included in the determination of the first transformation can be selected based on the magnitude of each principal component's respective eigenvalue. Thus V can be truncated into $V_\alpha$ by zeroing the least significant principal components (eigenvectors). That is, the principal components with the greatest eigenvalues can be used. The first transformation can therefore be defined as:

$$(X-M)V_\alpha$$

Where X is the vector or matrix that is being transformed (e.g. the centred matrix B).

At 512, the entity characterisation system 302 determines the intermediate data set using the SVD of the centred matrix B. In some embodiments, the entity characterisation system 302 determines the intermediate data set by right multiplying the centred matrix B by $V_\alpha$. In other words, the intermediate data set can be determined by calculating $BV_\alpha$.

The intermediate data set is a lower dimensional representation of the first data set, however, a significant portion of the variance of the first data set is retained in the intermediate data set. Exploratory data analysis can therefore be performed on the intermediate data set to identify patterns that may be present in the intermediate data set. The results of such an exploratory data analysis can provide meaningful insight into the nature of the intermediate data set, and therefore the first data set.

Determining Entity Characteristics According to Method 600

Figure 6:
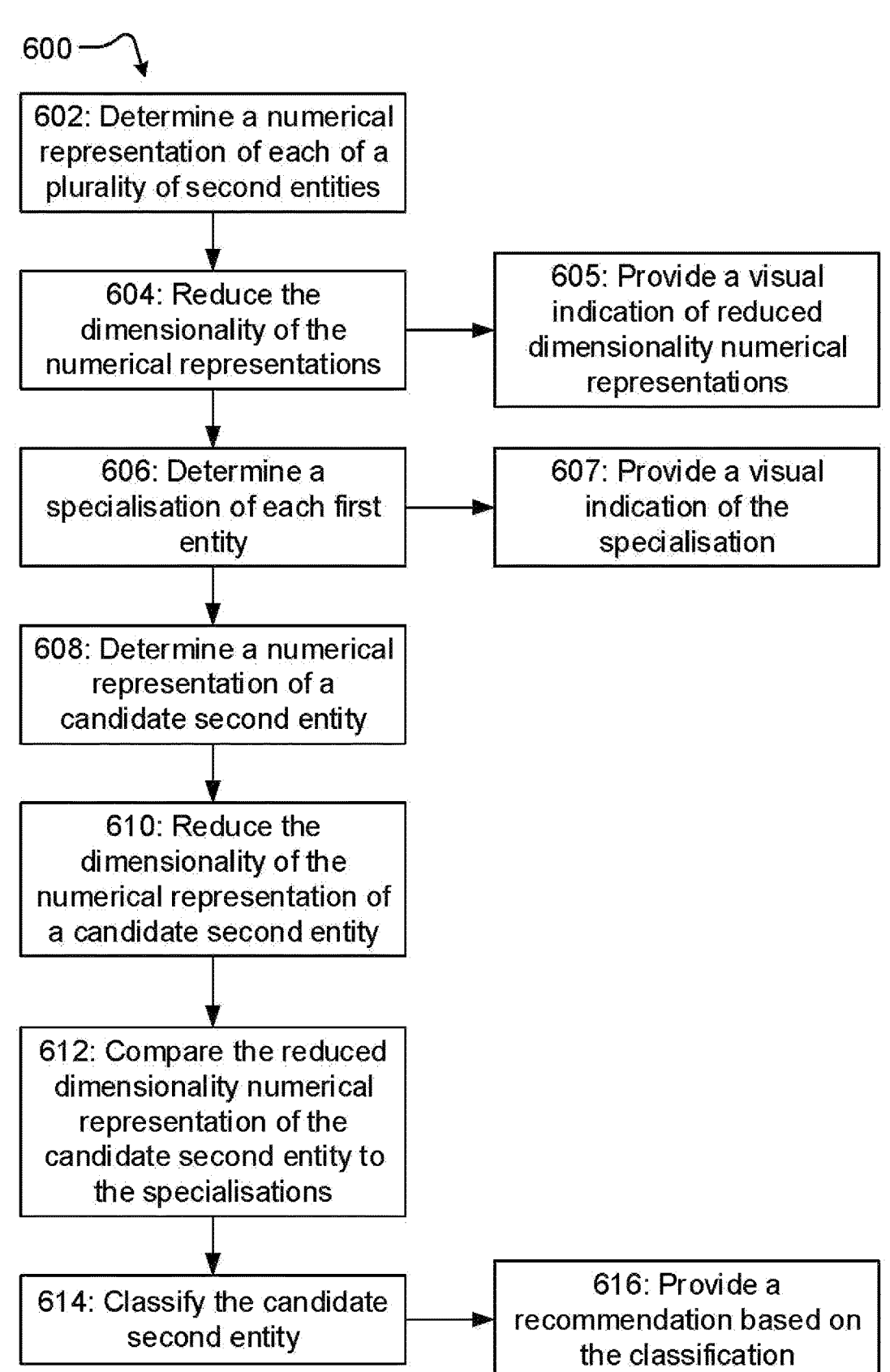
FIG. 6 is a process flow diagram of another method of determining entity characteristics, according to some embodiments.

Referring now to FIG. 6, there is shown a process flow diagram of a computer-implemented method 600 for determining entity characteristics, according to some embodiments. In some embodiments, the method 600 is performed by the entity characterisation system 302 illustrated in FIG. 3. For example, the one or more processors 304 may be configured to execute instructions 314 stored in memory 306 to cause the entity characterisation system 302 to perform the method 600.

At 602, the entity characterisation system 302 determines a numerical representation of each of the plurality of second entities. The entity characterisation system 302 therefore determines the first data set representing the second entities. The numerical representation module 332 may determine the numerical representations of the second entities. Each numerical representation is associated with a respective second entity, which is itself associated with a respective first entity, as previously described.

The entity characterisation system 302 may determine the numerical representations from the database 308 as described with reference to the method 400 and FIG. 4. In some embodiments, the entity characterisation system 302 may determine the numerical representations as described in Australian provisional patent application 2020901198 filed on 15 Apr. 2020, the contents of which are incorporated herein by reference. The entity characterisation system 302 may store the numerical representations in the memory 306. The numerical representations may be stored in the form of the first data set.

At 604, the entity characterisation system 302 reduces the dimensionality of the numerical representations to produce a plurality of reduced dimensionality numerical representations. In some embodiments, the dimensionality reduction module 324 may reduce the dimensionality of the numerical representations to produce the intermediate numerical representations. Each reduced dimensionality numerical representation corresponds to a respective numerical representation.

The entity characterisation system 302 performs two dimensionality reduction operations on the numerical representations to produce the reduced dimensionality numerical representations, as described with reference to the method 400 and FIG. 4.

The entity characterisation system 302 reduces the dimensionality of the numerical representations to produce intermediate numerical representations, as described with reference to the method 400. The entity characterisation system 302 stores the intermediate numerical representations in the memory 306. The entity characterisation system 302 may discard the stored numerical representations, as previously described.

The entity characterisation system 302 determines a first transformation as described with reference to the method 400. The first transformation is configured to transform input data of the same dimensionality as the numerical representations into output data of the same dimensionality as the intermediate numerical representations. The entity characterisation system 302 stores the first transformation in the memory 306. The entity characterisation system 302 may perform a principal component analysis using the numerical representations as input data to reduce the dimensionality of the numerical representations, as previously described.

The entity characterisation system 302 reduces the dimensionality of the intermediate numerical representations to produce reduced dimensionality numerical representations of the second entities, as described with reference to method 400. Each reduced dimensionality numerical representation corresponds to a respective intermediate numerical representation. Each reduced dimensionality numerical representation also corresponds to a respective numerical representation. The dimensionality reduction module 324 may reduce the dimensionality of the intermediate numerical representations to produce the reduced dimensionality numerical representations. The entity characterisation system 302 stores the reduced dimensionality numerical representations in the memory 306. The entity characterisation system 302 may discard the stored intermediate numerical representations, as previously described.

The entity characterisation system 302 determines a second transformation as described with reference to the method 400. The second transformation is configured to transform input data of the same dimensionality as the intermediate numerical representations into output data of the same dimensionality as the reduced dimensionality numerical representations. The entity characterisation system 302 stores the second transformation in the memory 306. The entity characterisation system 302 may perform UMAP using the intermediate numerical representations as input data to produce the reduced dimensionality numerical representations, and to determine the second transformation, as previously described.

As the first data set comprises the numerical representations, it can be said that the entity characterisation system 302 reduces the dimensionality of the first data set to produce the second data set, as previously described.

As previously described, the reduced dimensionality numerical representations can be used to visualise patterns that are difficult to discern when observing the higher dimensional numerical representations and/or intermediate representations. In other words, the second data set can be used to visualise patterns that are difficult to discern when observing the higher dimensional first data set and/or intermediate data set. For example, when the numerical representations are two-dimensional, the numerical representations can be visually represented using two-dimensional visual representations like those illustrated in FIG. 1.

At 605, the entity characterisation system 302 provides a visual representation of the reduced dimensionality numerical representations. In some embodiments, providing the visual representation at 605 is optional. That is, the entity characterisation system 302 may determine a specialisation of each of the first entities at 606 without providing the visual representation at 605.

The entity characterisation system 302 is configured to encode the reduced dimensionality numerical representations into one or more display object(s). In some embodiments, the visualisation module 328 encodes the reduced dimensionality numerical representations into the one or more display object(s). The reduced dimensionality numerical representations of the second entities associated with a first entity can be encoded into the display object. The display object can be in the form of a bitmap (e.g. a PNG or JPEG file) that illustrates the visual representation. Alternatively, the display object(s) can be in the form of display object program code. The display object program code can be executable to render the visual representation. The entity characterisation system 302 is configured to transmit the display object(s) using the communications network 310. In particular, the entity characterisation system 302 is configured to transmit the display object(s) to the computing device 316 using the communications network 310. The computing device 316 is configured to render the display object(s) on the user interface 318.

In some embodiments, the entity characterisation system 302 is configured to transmit the reduced dimensionality numerical representations to the computing device 316. The computing device 316 may be configured to encode the numerical representations into the one or more display object(s) and provide the visual representations via the user interface 318.

As previously described, FIG. 1 illustrates the plurality of exemplary visual representations 100, 102, 104, 106, 108, 110, 112, 114, 116, 118, 120, 122 corresponding to a plurality of exemplary first entities (entities A through L). The visual representations 100, 102, 104, 106, 108, 110, 112, 114, 116, 118, 120, 122 are two-dimensional representations in the form of scatter plots. Each visual representation 100, 102, 104, 106, 108, 110, 112, 114, 116, 118, 120, 122 illustrates a portion of the second space. Each visual representation 100, 102, 104, 106, 108, 110, 112, 114, 116, 118, 120, 122 comprises a first axis and a second axis. The first axis corresponds with the first reduced dimensionality numerical representation feature. The second axis corresponds with the second reduced dimensionality numerical representation feature. Each point 124 of each visual representation 100, 102, 104, 106, 108, 110, 112, 114, 116, 118, 120, 122 corresponds to a reduced dimensionality numerical representation of one of the second entities associated with the relevant first entity.

Providing the visual representations 100, 102, 104, 106, 108, 110, 112, 114, 116, 118, 120, 122 for display can provide a useful insight into patterns that are present in the set of second entities that are associated with a respective first entity. These patterns may be difficult or impossible to discern if one were using the higher dimensional numerical representations. As previously described, the clusters 126 of points 124 apparent in the visual representations 100, 102, 104, 106, 108, 110, 112, 114, 116, 118, 120, 122 can indicate inherent similarities between the second entities to which the points 124 correspond.

Providing the visual representations 102, 104, 106, 108, 110, 112, 114, 116, 118, 120, 122 for display as described provides clear technical advantages. Due to the high dimensionality of the numerical representations, it is not possible to graphically display them in their original dimensionality in a way that can convey useful insight into the numerical representations. By reducing the dimensionality of the numerical representations and providing the visual representations 102, 104, 106, 108, 110, 112, 114, 116, 118, 120, 122, the patterns that are present in the numerical representations of second entities that are associated with a respective first entity can be clearly visualised. Furthermore, the visual representations can be easily rendered on a display such that the available space on the display is efficiently used. Thus, providing the visual representations 102, 104, 106, 108, 110, 112, 114, 116, 118, 120, 122 for display as described provides a clear improvement to the functioning of the computing system on which the method is executed.

At 606, the entity characterisation system 302 determines a specialisation of each of the first entities. In some embodiments, determining the specialisation of one of the first entities comprises determining a similarity among at least some of the second entities that are associated with that first entity, as described herein. The entity characterisation system 302 determines the specialisation of a first entity based on the reduced dimensionality numerical representations of the second entities that are associated with that first entity. In particular, the specialisation determination module 326 may determine the specialisation of each of the first entities.

The entity characterisation system 302 determines the specialisation of each of the first entities by determining a specialisation function for each first entity. The entity characterisation system 302 determines the specialisation function by centring a kernel function on the reduced dimensionality numerical representations of the second entities associated with the respective first entity, and summing the kernel functions, as previously described. In other words, in some embodiments, the entity characterisation system 302 determines the specialisation function for each first entity by performing kernel density estimation using the reduced dimensionality numerical representations of the second entities associated with the respective first entity, as previously described.

The entity characterisation system 302 determines one or more specialisation numerical representations of each first entity based on the specialisation functions as previously described. Each specialisation numerical representation corresponds with a specialisation of the respective first entity. In some embodiments, the entity characterisation system 302 associates a class and/or label corresponding with the determined specialisation to each first entity, as previously described.

At 607, the entity characterisation system 302 provides a visual representation of one or more of the specialisations determined at 606. In some embodiments, providing the visual representation of one or more of the specialisations determined at 606 is optional. That is, the entity characterisation system 302 may determine a numerical representation of a candidate second entity at 608 without providing the visual representation of one or more of the determined specialisations at 607.

In some embodiments, the entity characterisation system 302 encodes one or more of the specialisation functions into one or more specialisation function display object(s). In some embodiments, the visualisation module 328 encodes the specialisation functions into the one or more specialisation function display object(s). For example, the specialisation function of a specified first entity can be encoded into the specialisation function display object. The specialisation function display object can be in the form of a bitmap (e.g. a PNG or JPEG file) that provides a visual representation of the encoded specialisation function. Alternatively, the specialisation function display object can be in the form of specialisation function display object program code. The specialisation function display object program code can be executable to render the visual representations. The entity characterisation system 302 is configured to transmit the specialisation function display object(s) using the communications network 310. In particular, the entity characterisation system 302 is configured to transmit the specialisation function display object(s) to the computing device 316 using the communications network 310. The computing device 316 is configured to render the specialisation functions on the user interface 318, thereby providing the visual indication of the relevant specialisation(s).

In some embodiments, the entity characterisation system 302 is configured to transmit the specialisation functions to the computing device 316. The computing device 316 may be configured to encode the specialisation functions into the one or more specialisation function display object(s) and provide the visual representations via the user interface 318.

As previously described, FIG. 2 illustrates the plurality of exemplary alternative visual representations 200, 202, 204, 206, 208, 210, 212, 214, 216, 218, 220, 222 corresponding to the plurality of first entities (entities A through L). The visual representations 200, 202, 204, 206, 208, 210, 212, 214, 216, 218, 220, 222 are two-dimensional representations in the form of heat maps. Each visual representation 200, 202, 204, 206, 208, 210, 212, 214, 216, 218, 220, 222 represents the specialisation function associated with a particular first entity. The magnitude of the specialisation function is represented by a corresponding colour, thereby producing the heat maps. The visual representations 200, 202, 204, 206, 208, 210, 212, 214, 216, 218, 220, 222 in the form of heat maps can improve the ease with which patterns present in the numerical representations associated with a particular first entity can be identified, relative to using the direct visual representations 100, 102, 104, 106, 108, 110, 112, 114, 116, 118, 120, 122 of the relevant numerical representations. Although illustrated in the form of heat maps, it will be understood that the visual representations could be in other forms, such as topographical maps, contour plots, two-dimensional representations of three-dimensional surfaces representing the specialisation functions etc.

Providing the visual representations 200, 202, 204, 206, 208, 210, 212, 214, 216, 218, 220, 222 for display as described provides clear technical advantages. Due to the high dimensionality of the numerical representations, it is not possible to graphically display them in their original dimensionality in a way that can convey useful insight into the numerical representations. By reducing the dimensionality of the numerical representations and providing the visual representations 200, 202, 204, 206, 208, 210, 212, 214, 216, 218, 220, 222, the patterns that are present in the set of second entities that are associated with a respective first entity can be clearly visualised. Furthermore, the visual representations can be easily rendered on a display, efficiently using the available space on the display. Thus, providing the visual representations 200, 202, 204, 206, 208, 210, 212, 214, 216, 218, 220, 222 for display as described provides a clear improvement to the functioning of the computing system on which the method is executed.

At 608, the entity characterisation system 302 determines a numerical representation of a candidate second entity. The candidate second entity may be a new second entity that is not associated with a first entity. That is, the candidate second entity may be a second entity interested in engaging the services of a first entity. The candidate second entity may desire a recommendation for an optimised first entity. The optimised first entity may specialise in providing services to second entities operating in the industry of the candidate second entity. The numerical representation module 332 may determine the numerical representation of the candidate second entity. The numerical representation of the candidate second entity may comprise a multi-dimensional vector characterising the candidate second entity.

The entity characterisation system 302 may determine the numerical representation of the candidate second entity from the database 308. For example, the numerical representation of the candidate second entity may be stored in the database 308. The entity characterisation system 302 may retrieve the numerical representation of the candidate second entity from the database 308, thereby determining the numerical representation of the candidate second entity. In some embodiments, the entity characterisation system 302 may determine the numerical representation of the candidate second entity as described in Australian provisional patent application 2020901198 filed on 15 Apr. 2020, the contents of which are incorporated herein by reference. The entity characterisation system 302 may store the numerical representation of the candidate second entity in the memory 306. The numerical representation of the candidate second entity may be stored as a candidate second entity vector. The candidate second entity vector may comprise a plurality of candidate second entity features.

The numerical representation of the candidate second entity and/or the candidate second entity vector can be n-dimensional data. Therefore, a first space of n dimensions can comprise the candidate second entity vector and/or the numerical representation of the candidate second entity. In some embodiments, the numerical representation of the candidate second entity and/or the candidate second entity vector is 2412-dimensional. In some embodiments, the candidate second entity vector and/or the numerical representation of the candidate second entity can have a dimensionality of between 50 and 10000 dimensions.

At 610, the entity characterisation system 302 reduces the dimensionality of the numerical representation of the candidate second entity to produce a reduced dimensionality numerical representation of the candidate second entity. The reduced dimensionality numerical representation of the candidate second entity is of reduced dimensionality with respect to the numerical representation of the candidate second entity. In some embodiments, the dimensionality reduction module 324 reduces the dimensionality of the numerical representation of the candidate second entity.

The entity characterisation system 302 applies the first transformation to the numerical representation of the candidate second entity to produce an intermediate numerical representation of the candidate second entity. This is the first dimensionality reduction operation of two dimensionality reduction operations performed by the entity characterisation system 302. The entity characterisation system 302 stores the intermediate numerical representation of the candidate second entity in the memory 306. The entity characterisation system 302 may discard the stored numerical representation of the candidate second entity. In some embodiments, the numerical representation of the candidate second entity is 2412-dimensional, and the intermediate numerical representation of the candidate second entity is 50-dimensional. As the intermediate numerical representation of the candidate second entity is lower-dimensional data than the numerical representation of the candidate second entity, storing the intermediate numerical representation in the memory 306 and discarding the numerical representation from the memory 306 advantageously frees storage capacity of the memory 306.

The entity characterisation system 302 applies the second transformation to the intermediate numerical representation of the candidate second entity to produce the reduced dimensionality numerical representation of the candidate second entity. This is the second dimensionality reduction operation of the two dimensionality reduction operations performed by the entity characterisation system 302. The entity characterisation system 302 stores the reduced dimensionality numerical representation of the candidate second entity in the memory 306. The entity characterisation system 302 may discard the stored intermediate numerical representation. In some embodiments, the intermediate numerical representation of the candidate second entity is 50-dimensional, and the reduced dimensionality numerical representation of the candidate second entity is 2-dimensional. As the reduced dimensionality numerical representation of the candidate second entity is lower-dimensional data than the intermediate numerical representation of the candidate second entity, storing the reduced dimensionality numerical representation in the memory 306 and discarding the intermediate numerical representation from the memory 306 advantageously frees storage capacity of the memory 306.

At 612, the entity characterisation system 302 compares the reduced dimensionality numerical representation of the candidate second entity to the specialisation of each of the plurality of first entities. In some embodiments, the classification module 330 compares the reduced dimensionality numerical representation of the candidate second entity to the specialisation numerical representations. In particular, the entity characterisation system 302 compares the reduced dimensionality numerical representation of the candidate second entity to the specialisation numerical representations of each of the plurality of first entities.

The entity characterisation system 302 compares the reduced dimensionality numerical representation of the candidate second entity to the specialisation of each of the plurality of first entities using a k-nearest neighbour (k-NN) algorithm. In some embodiments, the specialisation data set is used as training data for the k-nearest neighbour algorithm. In some embodiments, the specialisation numerical representations are used as training data for the k-nearest neighbour algorithm. In some embodiments, the entity characterisation system 302 may execute a k-NN library and/or code as available at: https://scikit-learn.org/stable/modules/neighbors.html.

The entity characterisation system 302 determines a distance between the reduced dimensionality numerical representation of the candidate second entity and each specialisation numerical representation. The distance may be a Euclidean distance in a space that spans the specialisation numerical representations and the reduced dimensionality numerical representation of the candidate second entity (e.g. the second space). The entity characterisation system 302 determines the k specialisation numerical representations that are nearest to the reduced dimensionality numerical representation of the candidate second entity. In some embodiments, the entity characterisation system 302 stores the k specialisation numerical representations that are nearest to the reduced dimensionality numerical representation of the candidate second entity as a classification data set in memory 306. In some embodiments, k is equal to 1.

At 614, the entity characterisation system 302 classifies the candidate second entity based on the comparison between the reduced dimensionality numerical representation of the candidate second entity and the specialisation of each of the plurality of first entities. In some embodiments, the classification module 330 classifies the candidate second entity.

The entity characterisation system 302 classifies the candidate second entity by associating the candidate second entity with the first entity of the specialisation numerical representation closest to the reduced dimensionality numerical representation of the candidate second entity. In particular, the entity characterisation system 302 classifies the candidate second entity by associating the candidate second entity with the mentioned first entity. Associating the candidate second entity with the relevant first entity may comprise appending a label to the numerical representation of the candidate second entity and/or the reduced dimensionality numerical representation of the candidate second entity, the label corresponding to the relevant first entity. The first entity of the specialisation numerical representation closest to the reduced dimensionality numerical representation of the candidate second entity may be referred to as the optimised first entity. Said first entity has therefore been determined to have a specialisation corresponding with, and being optimised for providing high quality services to the candidate second entity.

In some embodiments, the entity characterisation system 302 generates an output indicative of a plurality of first entities that may be applicable to the candidate second entity. The plurality of first entities that are indicated in the output may be those with specialisation numerical representations closest to the reduced dimensionality numerical representation of the candidate second entity. That is, the plurality of first entities that are indicated in the output are optimised for the candidate second entity. The system 300 displays the output to a user. The output may be provided on, for example, the user interface 318. The system 300 is configured to receive an input that is indicative of the user's preferred first entity, which may be referred to as a selected first entity. The system 300 may, for example, receive the input via the user interface 318. In these embodiments, the entity characterisation system 302 classifies the candidate second entity by associating the candidate second entity with the selected first entity.

At 616, the entity characterisation system 302 provides a recommendation based on the classification. The recommendation may indicate that the relevant first entity is best suited for the candidate second entity. That is, the relevant first entity may specialise in the field of the candidate second entity. In some embodiments, the entity characterisation system 302 encodes the recommendation into one or more recommendation display object(s). In some embodiments, the recommendation module 332 encodes the recommendation into the one or more recommendation display object(s). The recommendation display object(s) can be in the form of a bitmap (e.g. a PNG or JPEG file) that provides a visual representation of the encoded recommendation. Alternatively, the recommendation display object(s) can be in the form of recommendation display object program code. The recommendation display object program code can be executable to render the recommendation. The entity characterisation system 302 is configured to transmit the recommendation display object(s) using the communications network 310. In particular, the entity characterisation system 302 is configured to transmit the recommendation display object(s) to the computing device 316 (or a candidate second entity computing device) using the communications network 310. The computing device 316 (or the candidate second entity computing device) is configured to render the recommendation on the user interface 318 (or a candidate second entity computing device user interface), thereby providing the visual indication of the recommendation.

Figure 7:
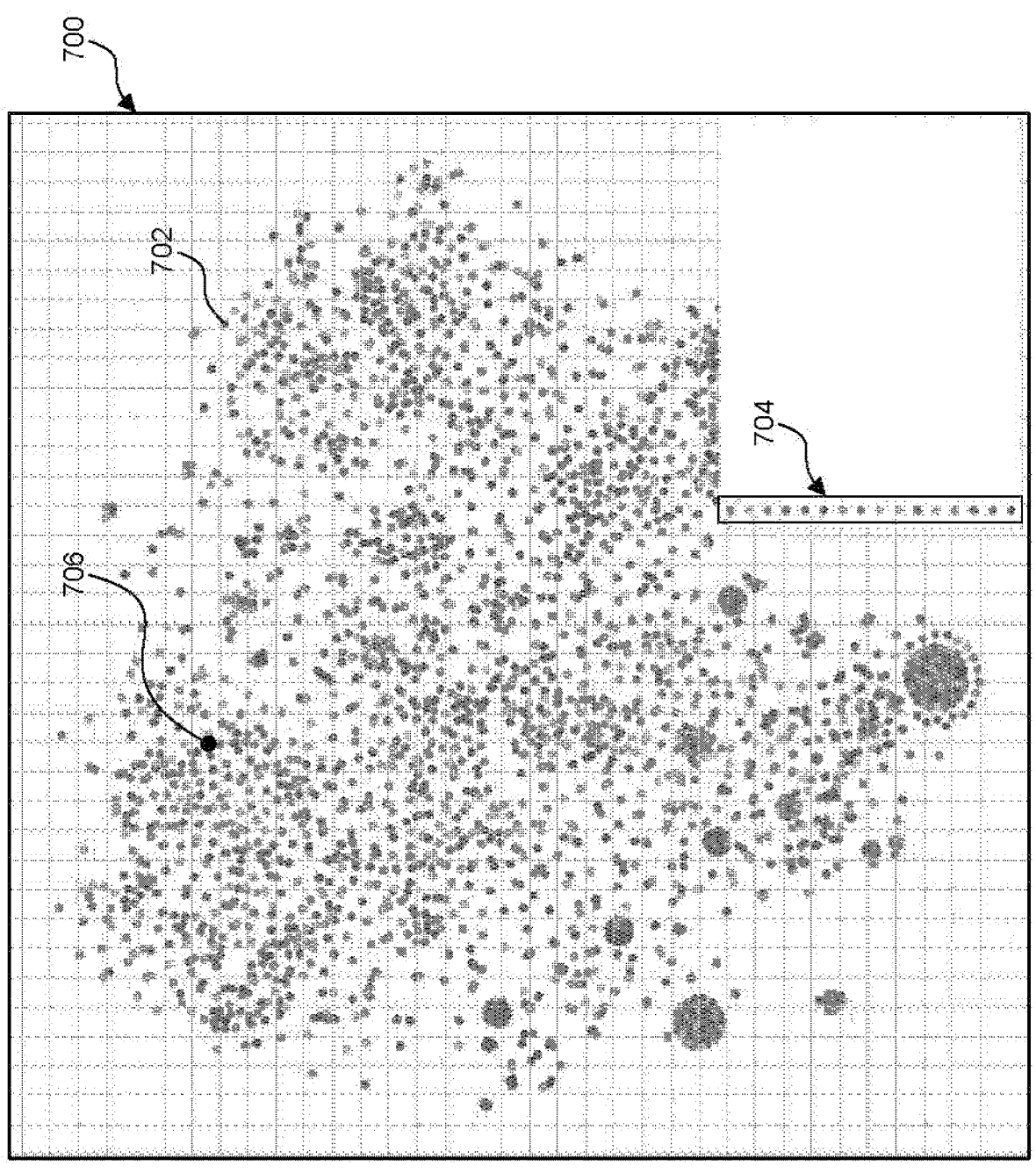
FIG. 7 illustrates a scatter plot visual representation depicting a plurality of reduced dimensionality numerical representations of second entities, according to some embodiments.

Analysis of the Reduced Dimensionality Numerical Representations and Specialisations FIG. 7 is a visual representation 700 of a plurality of reduced dimensionality numerical representations 702 of second entities. The visual representation 700 is in the form of a scatter plot. The plurality of reduced dimensionality numerical representations 702 may be associated with second entities that operate within a particular geographical region such as a country. The reduced dimensionality numerical representations 702 have been determined as described herein. Each reduced dimensionality numerical representation 702 is associated with one of a plurality of first entities 704, as described herein. In some embodiments, it is the first entities 704 that operate within a particular geographical region such as a country.

The visual representation 700 comprises a reduced dimensionality numerical representation 706 of a candidate second entity. The reduced dimensionality numerical representation 706 of the candidate second entity may be determined as described herein.

In some embodiments, entity characterisation system 302 executes a k-nearest neighbours algorithm to determine the specialisation of the candidate second entity. That is, the entity characterisation system 302 analyses the reduced dimensionality numerical representations 702 nearest to the reduced dimensionality numerical representation 706 of a candidate second entity and determines the specialisation accordingly. For example, where k=1, the first entity that is associated with the nearest neighbouring reduced dimensionality numerical representation 702 may be associated with the candidate second entity. Thus, a recommendation referring to the first entity that is associated with the nearest neighbouring reduced dimensionality numerical representations 702 may be provided to the candidate second entity.

As is clear from FIG. 7, however, the large number of reduced dimensionality numerical representations 702 that are associated with various first entities significantly reduces the effectiveness of using a k-NN algorithm to classify the candidate second entity. The large number of reduced dimensionality numerical representations 702 results in a relatively large amount of "noise" associated with regions which are associated with particular classifications of first entities (which also vary significantly depending on k, reducing the reliability of such a classification).

The computer-implemented method 400 and the computer-implemented method 600 described herein provide significant advantages to a k-NN approach to classifying the candidate second entity. As is described herein, one or more specialisations can be determined for each first entity, and the reduced dimensionality numerical representation of a candidate second entity can be compared to these specialisations. The specialisations are determined using continuous specialisation functions that are generated by a kernel density estimation. The specialisation functions are continuous because the kernel functions are continuous. Determining a continuous specialisation function enables insight to be drawn both from the reduced dimensionality numerical representations themselves, and their position/density. By determining the specialisations and classifying the candidate second entity based on the specialisations, the computer-implemented methods 400, 600 of the present disclosure effectively filter out the "noise" that is present when looking broadly at all of the reduced dimensionality numerical representations 702 to enable more accurate and useful inferences to be made.

Figure 8:
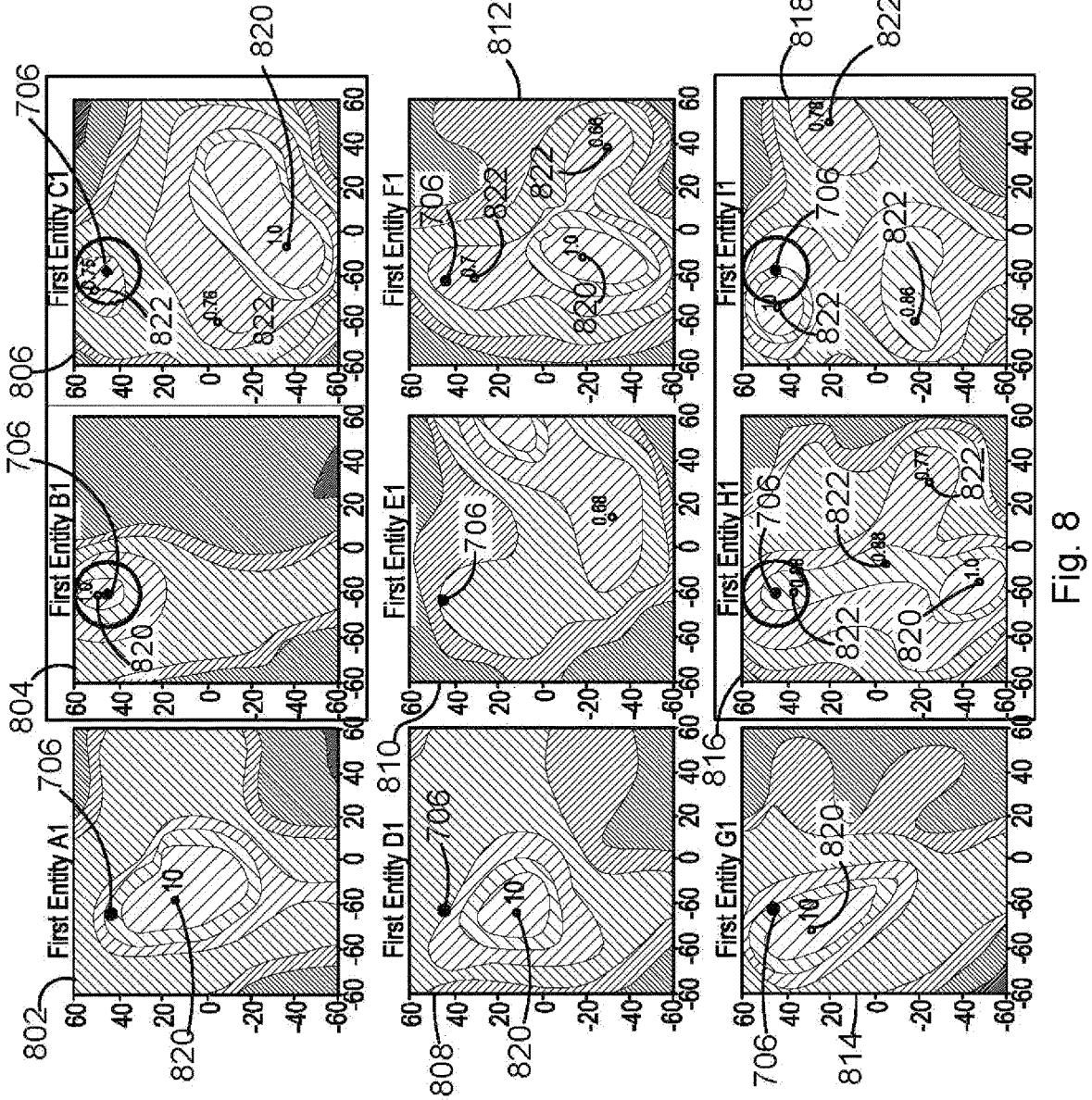
FIG. 8 illustrates a plurality of visual representations, each depicting a specialisation function of a respective first entity (first entities A1 to I1), according to some embodiments.

FIG. 8 illustrates a plurality of visual representations 800, 802, 804, 806, 808, 810, 812, 814, 816, 818 that depict specialisation functions of first entities A1 to I1 respectively. The visual representations 800, 802, 804, 806, 808, 810, 812, 814, 816, 818 were generated as described herein. Specifically, a reduced dimensionality numerical representation was determined for each second entity. A kernel function was centred at each of the reduced dimensionality numerical representations of the second entities and the kernel functions were summed for second entities associated with a common first entity of first entities A1 to I1, thereby determining the specialisation function of each of first entities A1 to I1.

Each specialisation function illustrated in FIG. 8 comprises a global maximum 820. Some of the specialisation functions also comprise one or more local maximum 822 that is distinct from the global maximum 820.

As illustrated in FIG. 7, the reduced dimensionality numerical representation of the candidate second entity can be determined and illustrated on the visual representation 700. The reduced dimensionality numerical representation 706 of a candidate second entity can also be compared to the visual representations 800, 802, 804, 806, 808, 810, 812, 814, 816, 818, as is shown in FIG. 8. For example, as shown in FIG. 8, the reduced dimensionality numerical representation 706 of the candidate second entity is near the global maximum 820 of first entities B1, C1 and H1, and is near a local maximum 822 of first entity I1. It can therefore be visually inferred from the visual representations 800, 802, 804, 806, 808, 810, 812, 814, 816, 818 that the candidate second entity may be well suited to one or more of first entities B1, C1, H1 and I1. A suitable recommendation to the candidate second entity may be made on this basis.

Figure 9:
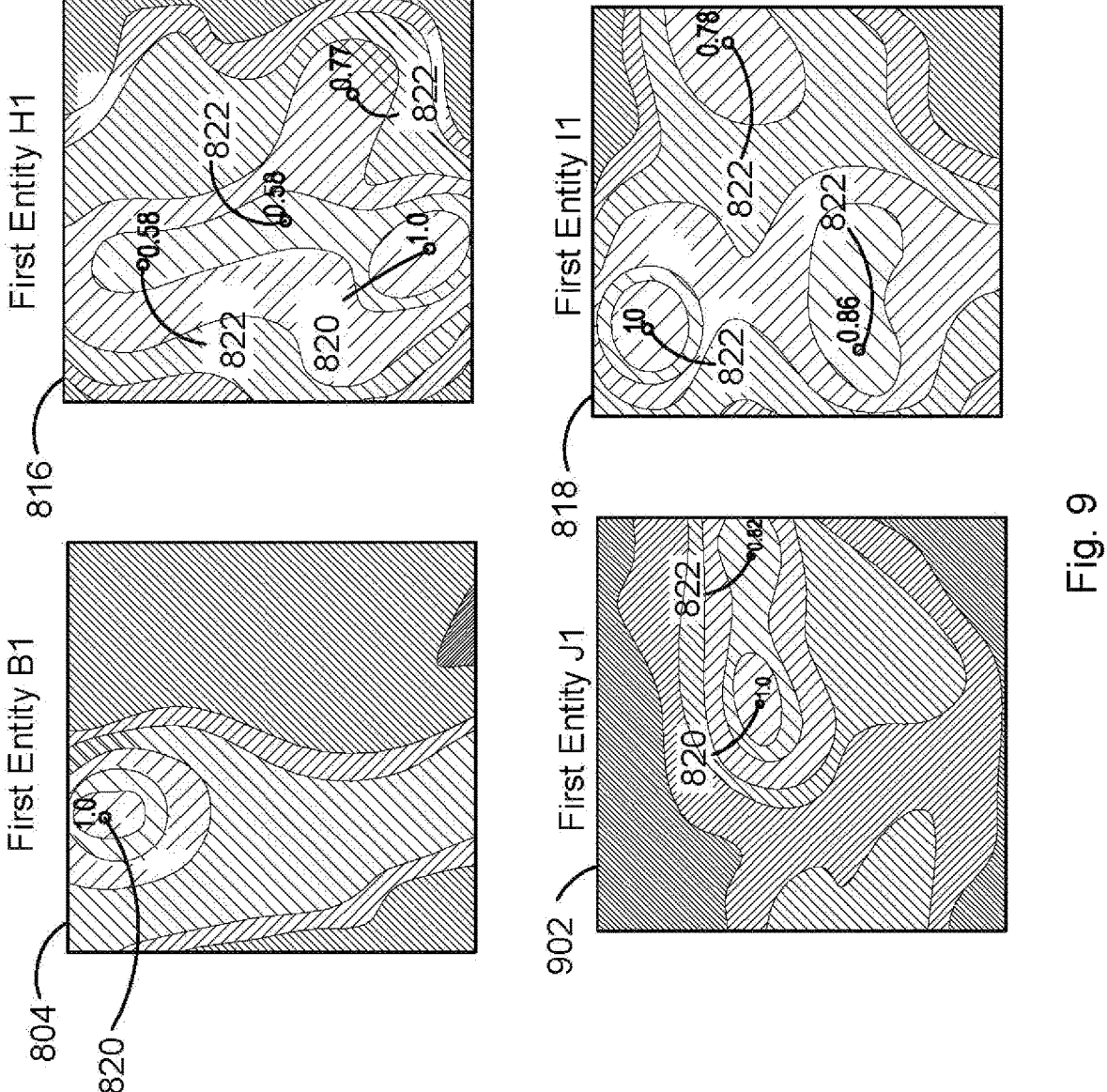
FIG. 9 illustrates visual representations of the specialisation functions of first entities B1, H1, J1 and I1, according to some embodiments.

It is clear that first entities may be associated with a plurality of specialisations. FIG. 9 illustrates the visual representations 804, 816, 818 and a visual representation 902 that the specialisation functions of first entities B1, H1, I1 and of another first entity, first entity J1. The visual representation 804 illustrates that first entity B1 is associated with one specialisation (indicated by the relevant global maximum 820). The visual representations 816, 818 and 902 illustrate that first entities H1, I1 and J1 are each associated with a plurality of specialisations. Specifically, each of these first entities includes a global maximum 820 and one or more local maximum 820. A magnitude of the local maximum 822 is greater than a magnitude threshold (e.g. 0.7), thereby rendering the local maximum 822 a notional specialisation of the respective first entity. As a result of the diversity in possible specialisations of a first entity, comparing candidate second entities to the global maximum 820 alone may not enable the provision of an optimised recommendation to the candidate second entity. Nor would referring to an average of the global maximum 820 and the local maxima 822 of a first entity. Therefore, in many cases, considering an "average" second entity that is associated with a first entity does not enable the provision of an optimised recommendation to the candidate second entity. The present disclosure advantageously enables comparison of the candidate second entity to each of the first entities in a way that first entities with a diverse range of specialisations are more appropriately accounted for. This enables better optimised recommendations to be determined and provided to the candidate second entity.

Figures 10, 11:
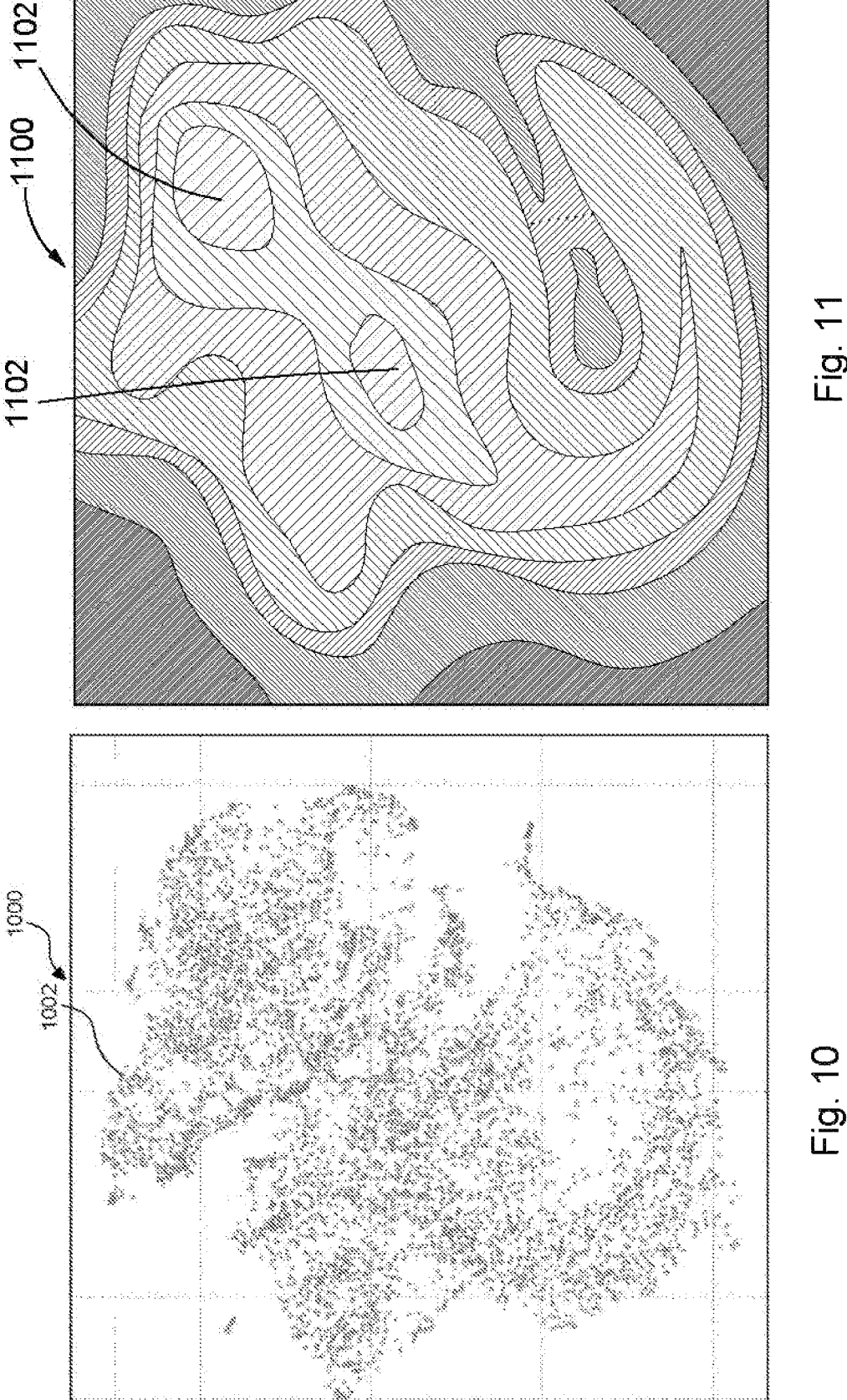
FIG. 10 illustrates a scatter plot visual representation depicting a plurality of reduced dimensionality numerical representations of second entities associated with a region, according to some embodiments.
FIG. 11 illustrates a heat map visual representation depicting a specialisation function of a geographical region.

FIG. 10 is a visual representation 1000 depicting a plurality of reduced dimensionality numerical representations 1002 of second entities. The plurality of reduced dimensionality numerical representations 1002 may be associated with second entities that operate within a particular geographical region such as a country. The reduced dimensionality numerical representations 1002 have been determined as described herein. Each reduced dimensionality numerical representation 1002 may be associated with one of a plurality of first entities, as described herein. In some embodiments, it is the first entities that operate within the particular geographical region such as the country.

FIG. 11 is a region visual representation 1100 depicting a region landscape function of the geographical region. In particular, the region visual representation 1100 depicts a business landscape of the geographical region. The region visual representation 1100 is in the form of a region heat map. The region visual representation 1100 was generated as described herein. Specifically, a kernel function was centred at each of the reduced dimensionality numerical representations 1002 of second entities shown in FIG. 10 and the kernel functions were summed, thereby providing a three-dimensional function that is associated with the reduced dimensionality numerical representations 1002 of second entities of FIG. 10. The three-dimensional function may be referred to as a region landscape function. Alternatively, the three-dimensional function may be referred to as a specialisation function or a region specialisation function. As previously described, this specialisation function (the region landscape function) may be associated with second entities that operate within a particular geographical region such as a country, or with first entities that operate within a particular geographical region such as a country.

The region visual representation 1100 provides an indication of areas 1102 of a relatively high density of reduced dimensionality numerical representations 1002 and areas 1104 with a relatively low density of reduced dimensionality numerical representations 1002. The areas 1102 with the relatively high density of reduced dimensionality numerical representations 1002 are indicative of classes of second entities of the region with common characteristics. The areas 1104 with the relatively low density of reduced dimensionality numerical representations 1002 are indicative of classes of second entities that less-commonly operate in the region.

Figure 12:
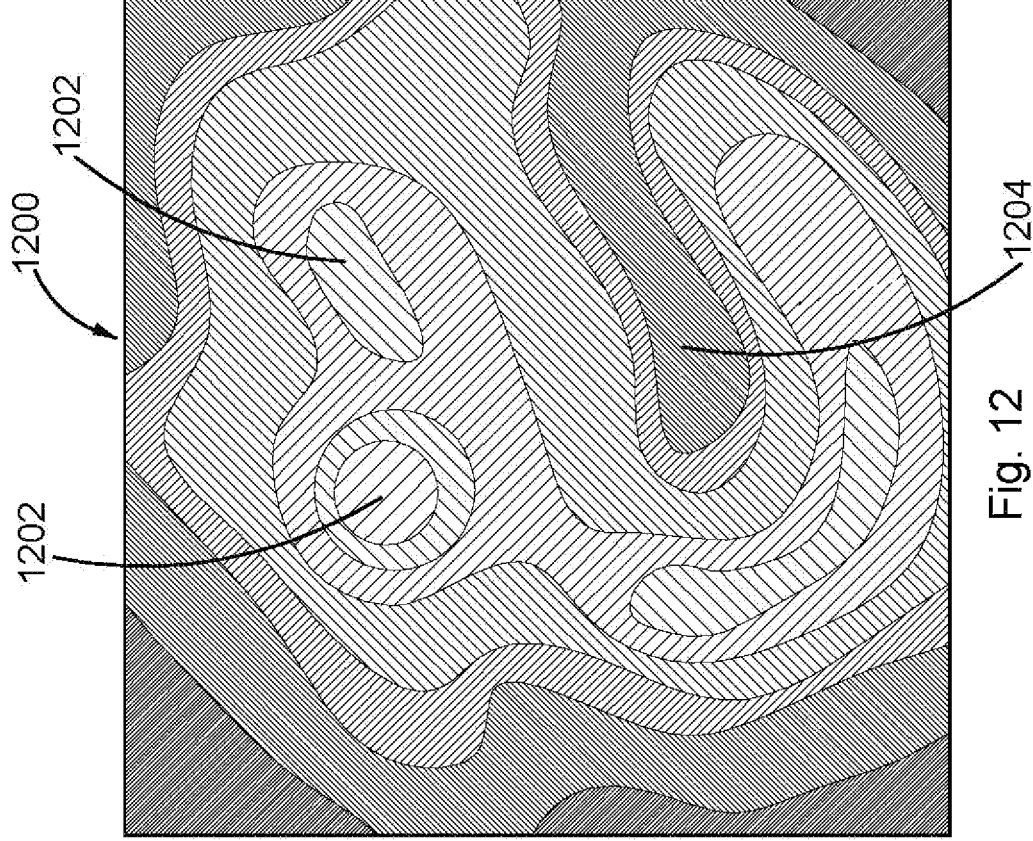
FIG. 12 illustrates a first entity visual representation depicting a specialisation function of a respective first entity associated with the region.

While FIG. 10 and FIG. 11 illustrate reduced dimensionality numerical representations 1002 of second entities and the region visual representation 1100 determined from that information, FIG. 12 is a first entity visual representation 1200 of a first entity specialisation function of a particular first entity. Where the second entities of FIGS. 10 and 11 are associated with respective first entities, the first entity visual representation 1200 may be a first entity specialisation function of a particular first entity of those respective first entities. The first entity visual representation 1200 is in the form of a first entity heat map. The first entity visual representation 1200 was generated as described herein using the reduced dimensionality numerical representations of second entities that are associated with the particular first entity.

The first entity visual representation 1200 provides an indication of areas 1202 of a relatively high density of reduced dimensionality numerical representations of second entities associated with the particular first entity and areas 1204 with relatively low density of reduced dimensionality numerical representations of second entities associated with the particular first entity. The areas 1202 with the relatively high density of reduced dimensionality numerical representations are indicative of specialisations of the particular first entity. The areas 1204 with the relatively low density of reduced dimensionality numerical representations are indicative of classes of second entities that are less-commonly serviced by the particular first entities.

The region landscape function and the first entity specialisation function can be used to compare attributes of the second entities that are associated with the first entity to the second entities that are associated with the plurality of first entities. FIG. 13 illustrates the region visual representation 1100, the first entity visual representation 1200 and a comparison visual representation 1300. The comparison visual representation 1300 is in the form of a comparison heat map.

The comparison visual representation 1300 is generated by subtracting the first entity specialisation function from the region landscape function to determine a comparison function. The comparison function is rendered such that particular magnitudes of the comparison function are associated with respective colours.

Useful information can be inferred from the comparison visual representation 1300. For example, a first region 1302, a second region 1304 and a third region 1306 can be visually identified on the comparison visual representation 1300. The first region 1302 is a region where the particular first entity has a relatively high market share. That is, the particular first entity is associated with a relatively high number of second entities whose reduced dimensionality numerical representations are located within the first region 1302 (i.e. the magnitude of the first entity specialisation function is greater than the magnitude of the region landscape function in the first region 1302). Values of the first region 1302 may be below a first comparison function magnitude threshold. Inferences can therefore be made about second entities whose reduced dimensionality numerical representations are located within the first region 1302.

For example, the entity characterisation system 302 may compare one or more of the numerical representation features of the numerical representations of these second entities to determine a similar feature. That is, the entity characterisation system 302 may compare a numerical representation feature of one of the numerical representations of these second entities to the corresponding numerical representation feature of one or more of the other relevant numerical representations. The entity characterisation system 302 may determine the similar feature based on this comparison. For example, a particular numerical representation feature of each, or of a significant proportion of the relevant second entities may fall within a feature range. The feature range may be a numerical range having an upper range boundary and a lower range boundary (e.g. between 0.5, the lower range boundary, and 0.6, the upper range boundary). Numerical representation features where the upper range boundary and the lower range boundary are within a range boundary threshold (e.g. 0.1) may be considered similar features. Therefore, in some embodiments, the entity characterisation system 302 may determine a plurality of similar features based on the comparison.

For example, the second entities whose reduced dimensionality numerical representations are located within the first region 1302 may tend to be in a particular industry such as the professional, scientific or technical services industry (e.g. they may be 1.8× more likely to be in one of these industries relative to second entities whose reduced dimensionality numerical representations are located outside the first region 1302) and may tend to have less employees than other second entities (e.g. they may be 0.5× as likely to have employees as second entities whose reduced dimensionality numerical representations are located outside the first region 1302). In this case, the professional, scientific or technical services industry may be a similar feature and the tendency to have less employees (or the number of employees) may be another similar feature.

The second region 1304 is a region where the particular first entity has a relatively low market share. That is, the particular first entity is associated with a low number of second entities whose reduced dimensionality numerical representations are located within the second region 1304 (i.e. the magnitude of the first entity specialisation function is less than the magnitude of the region landscape function in the second region 1304). Values of the second region 1304 may be above a first comparison function magnitude threshold. Inferences can therefore be made about second entities whose reduced dimensionality numerical representations are located within the second region 1304. For example, these second entities may tend to be in a particular industry such as the education industry (e.g. they may be 12× more likely to be in the education industry relative to second entities whose reduced dimensionality numerical representations are located outside the second region 1304) and may tend to have more employees than other second entities (e.g. they may be more likely to have 10 or more employees). In this case, the particular industry may be one similar feature and the tendency to have more employees (or the number of employees) may be another similar feature.

The third region 1306 is another region where the particular first entity has a relatively low market share. That is, the particular first entity is associated with a low number of second entities whose reduced dimensionality numerical representations are located within the third region 1306 (i.e. the magnitude of the first entity specialisation function is less than the magnitude of the region landscape function in the third region 1306). Values of the third region 1306 may be above a first comparison function magnitude threshold. Inferences can therefore be made about second entities whose reduced dimensionality numerical representations are located within the third region 1306. For example, these second entities may tend to be in a particular industry such as a construction industry or a manufacturing industry (e.g. they may be 3.3× more likely to be in the construction industry and 2.1× more likely to be in the manufacturing industry relative to second entities whose reduced dimensionality numerical representations are located outside the third region 1306) and may tend to have more employees than other second entities (e.g. they may be more likely to have 2 to 9 employees). In this case, the particular industry may be one similar feature and the tendency to have more employees (or the number of employees) may be another similar feature.

Improvements Provided by Computer-Implemented Methods 400 and 600

As described herein, the entity characterisation system 302 reduces the dimensionality of the numerical representations to produce the plurality of reduced dimensionality numerical representations. The entity characterisation system 302 performs two dimensionality reduction operations on the numerical representations to produce the reduced dimensionality numerical representations. Specifically, the entity characterisation system 302 reduces the dimensionality of the numerical representations to produce intermediate numerical representations. The entity characterisation system 302 then reduces the dimensionality of the intermediate numerical representations to produce reduced dimensionality numerical representations of the second entities.

The entity characterisation system 302 performs a principal component analysis using the numerical representations as input data to reduce the dimensionality of the numerical representations to produce the intermediate numerical representations. In some embodiments, the entity characterisation system 302 performs UMAP using the intermediate numerical representations as input data to produce the reduced dimensionality numerical representations. In some embodiments, entity characterisation system 302 performs t-SNE using the intermediate numerical representations and input data to produce the reduced dimensionality numerical representations.

Figure 14:
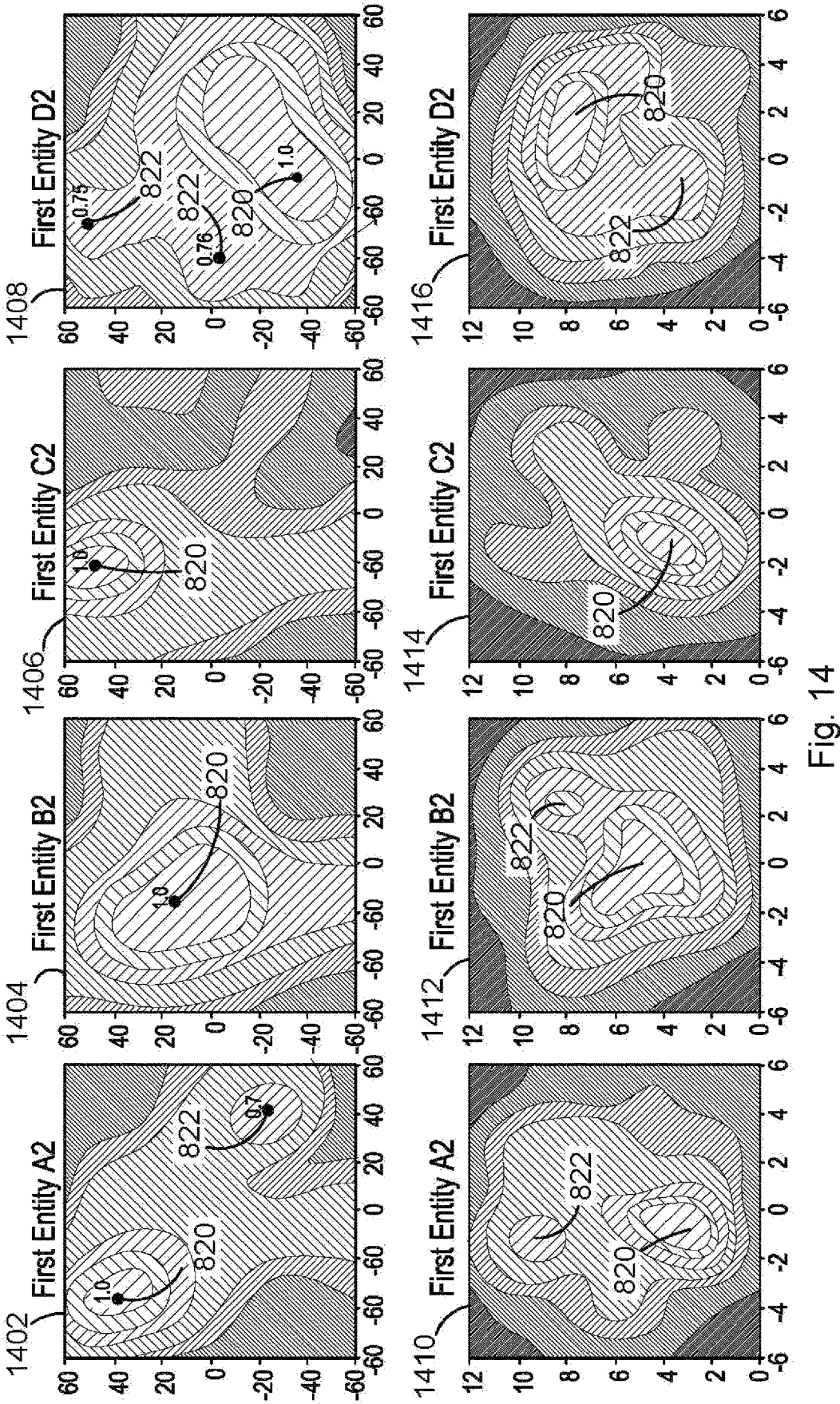
FIG. 14 illustrates a plurality of visual representations that depict the specialisation functions of a plurality of first entities, when the relevant reduced dimensionality numerical representations are produced using t-SNE and when they are produced using UMAP.

FIG. 14 illustrates a plurality of visual representations 1402, 1404, 1406, 1408 that depict specialisation functions of first entities A2 to D2 respectively, when the reduced dimensionality numerical representations are produced using t-SNE. As previously described, each of the visual representations 1402, 1404, 1406, 1408 includes a global maximum 820. Some of the visual representations also include one or more local maximum 822. FIG. 14 also illustrates a second plurality of visual representations 1410, 1412, 1414, 1416 that depict specialisation functions of the first entities A2 to D2 respectively, when the reduced dimensionality numerical representations are produced using UMAP. As previously described, each of the visual representations 1410, 1412, 1414, 1416 includes a global maximum 820. Some of the visual representations also include one or more local maximum 822. The visual representations 1402, 1404, 1406, 1408, 1410, 1412, 1414, 1416 were generated as described herein.

As can be seen in FIG. 14, determining the reduced dimensionality numerical representations using UMAP provides a number of visible advantages (that are provided in addition to the computational efficiencies provided by using UMAP). The plurality of visual representations 1410, 1412, 1414, 1416 show an increased preservation of the global structure of the data. For example, using UMAP increases the preservation of a global structure of the numerical representations. Specifically, it can be seen in FIG. 14 that the reduced dimensionality numerical representations determined using UMAP are more tightly contained than those determined using t-SNE. This enables more efficient use of the available space on the device displaying the relevant visual representation(s).

Furthermore, performing t-SNE on the same data multiple times can result in a significantly different output result each run. UMAP provides an advantage in this regard. Although UMAP is a stochastic algorithm, performing UMAP on the same data multiple times can result in more consistent outputs relative to when this is done using t-SNE.

Entity Recommendation

In some embodiments, a system, such as the system 300, may be configured to match candidate second entities with recommended or suggested target entities from a plurality of target entities, such as the first entities.

In some embodiments, a matching score for candidate second entity and target entity pairs is determined. The matching score may depend on a suitability of the target entity (e.g. the first entity) to the candidate second entity. In some embodiments, the matching score may depend on a suitability of the target entity to the candidate second entity as well as the suitability of the candidate second entity to the target entity. By taking a bidirectional approach to matching, i.e., considering both the suitability of the target entity to the candidate second entity and the candidate entity to the target entity, improved matching suggestions may be determined that are more likely to result in an engagement of the candidate second entity and the target entity, as the preferences, suitability, specialisation and/or needs of both the candidate second entity and target entity are being taken into consideration.

In some embodiments, the matching scores are determined based on the described comparison of the reduced dimensionality numerical representation of the candidate second entity to the specialisation of each of the plurality of first entities. For example, specialisation numerical representations may be determined for each of the plurality of the first entities. The matching score may be determined based at least in part on the specialisation numerical representations and the reduced dimensionality numerical representation of the candidate second entity. For example, the matching scores may be associated with a distance between the reduced dimensionality numerical representation of the candidate second entity and the specialisation numerical representations in the described p-dimensional space. In some embodiments, the matching score may be proportional to the distance between the reduced dimensionality numerical representation of the candidate second entity and the specialisation numerical representations in the described p-dimensional space. For example, the closest specialisation numerical representation may correspond to a matching score of 1, and the furthest specialisation numerical representation may correspond to a matching score of d, where d>1. In this case, the furthest specialisation numerical representation is d multiples of the distance between the closest specialisation numerical representation and the reduced dimensionality numerical representation of the candidate second entity away from the reduced dimensionality numerical representation of the candidate second entity in the described p-dimensional space.

Matching scores for multiple candidate second entity and target entity pairs may be determined. One or more suggested target entities from the multiple pairs may be presented to the candidate second entity as recommendations for the candidate entity to engage or connect with. This may be performed as described herein.

In some embodiments, suggested target entities may be first entities. These may be organisations, businesses or firms, and/or individual practitioners or service providers in one or more of organisations, businesses or firms, or sole practitioners or service providers. For example, it may be the case that a majority of practitioners in an accounting firm have expertise with start-up business and few have any experience with liquidating businesses. As opposed to the accounting firm, and its practitioners as a whole, being selected as a suggested target entity or suggested target entities, any person or persons in the accounting firm with expertise with liquidating businesses may be identified and provided as suggested target entities.

Optimising First Entity Targeting of Second Entities

As previously described, the visual representations generated as described herein can enable optimisation of first entity recommendations to candidate second entities. The visual representations can also provide insight into target markets that a particular first entity may wish to expand services into. For example, where a first entity has low market share with a class of second entities (e.g. with a particular industry), this is could be easily determined from the visual representation of that first entities specialisation function. The first entity can there determine markets that provide opportunities for expansion and increase marketing or business development efforts in those markets.

Parallel Processing

Although illustrated in series, it will be appreciated that one or more of the steps of the method 600 can be performed by the entity characterisation system 302 in parallel with one or more other steps of the method 600. This can advantageously improve the speed with which the method 600 can be performed. Performing steps of the method 600 using parallel processing can better utilise the computational hardware of the entity characterisation system 302, for example, if the one or more processors 304 comprise two or more cores. Furthermore, performing the method 600 using parallel processing can decrease the power consumption of the entity characterisation system 302. Other methods for determining entity characteristics may not be able to be performed more efficiently by computing devices with multiple processors and/or multiple cores.

In some embodiments, two or more processors may be configured to perform the method 600. For example, the entity characterisation system 302 may comprise two or more processors 304. The two or more processors 304 may comprise a first processor 304a and a second processor 304b.

Where two or more processors are configured to perform the method 600 (e.g. the first processor 304a and the second processor 304b), a first portion of the method 600 can be performed by a first processor of the two or more processors (e.g. the first processor 304a), and a second portion of the method 600 can be performed by a second processor of the two or more processors (e.g. the second processor 304b). For example, 602 to 606 of the method 600 can be performed by the first processor 304a and 608 and 610 can be performed simultaneously by the second processor 304b. In other words, 602 to 606 of the method 600 can be performed contemporaneously with 608 and 610 of the method 600 using multiple processors. 612 to 616 can then be performed by either of the first processor 304a, the second processor 304b or another processor. Such an implementation can improve the speed with which the entity characterisation system 302 can perform the method 600, better utilise the provided computational hardware, and decrease power consumption.

In some embodiments, the entity characterisation system 302 can comprise a processor 304 with two or more cores configured to perform the method 600. For example, the processor 304 of the entity characterisation system 302 may comprise a first processor core 304c and a second processor core 304d.

Where the entity characterisation system 302 comprises two or more processor cores (e.g. the first processor core 304c and the second processor core 304d), a first portion of the method 600 can be performed by the first processor core 304c and a second portion of the method 600 can be performed by the second processor core 304d. For example, 602 to 606 of the method 600 can be performed by the first processor core 304c and 608 and 610 can be performed simultaneously by the second processor core 304d. 612 to 616 can then be performed by either of the first processor core 304c, the second processor core 304d or another processor core. In other words, 602 to 606 of the method 600 can be performed contemporaneously with 608 and 610 of the method using multiple processor cores. 612 to 616 can then be performed by either of the first processor core 304c, the second processor core 304d or another processor core. Such an implementation can improve the speed with which the entity characterisation system 302 can perform the method 600, better utilise the provided computational hardware, and decrease power consumption.

In some embodiments, the one or more first entities are service entities. That is, the one or more first entities provide a service to one or more of the second entities. Examples of service entities can comprise individuals, businesses, companies, organisations, non-for profits, accountants, financial institutions, accounting firms or companies, legal professionals, law firms or companies, engineering professionals, engineering firms or companies, management consultants, management consulting firms or companies, medical professionals and medical firms or companies (e.g. hospitals, medical clinics).

In some embodiments, one or more second entities are client entities. That is, the one or more second entities are clients of one or more of the first entities. Examples of client entities can comprise individuals, businesses, companies, organisations, non-for profits, accountants, accounting firms or companies, legal professionals, law firms or companies, engineering professionals, engineering firms or companies, management consultants, management consulting firms or companies, medical professionals and medical firms or companies (e.g. hospitals, medical clinics).

In some embodiments, the candidate second entity is a candidate client entity. In some embodiments, the candidate second entity is not a client of one or more of the first entities. Examples of candidate second entities can comprise individuals, businesses, companies, organisations, non-for profits, accountants, accounting firms or companies, legal professionals, law firms or companies, engineering professionals, engineering firms or companies, management consultants, management consulting firms or companies, medical professionals and medical firms or companies (e.g. hospitals, medical clinics).

Objects as described in this specification, including the display object(s), specialisation function display object(s) and/or the recommendation object(s), may be discretely identifiable computing communication constructs capable of transmission and reception over a communication network. Objects may comprise data, and an object when received by a computing device may be capable of interpretation by the computing device to access the data. Objects may comprise program code, and an object, when received by a computing device may be capable of execution by the computing device to execute the program code. In some embodiments, objects may include a combination of data and program code. Objects may comprise one or more header elements and one or more payload elements. The payload elements may comprise the data or the program code or both.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for determining entity characteristics, the method comprising:
    determining, by the entity characterisation system, a numerical representation of each of a plurality of second entities, each numerical representation comprising a multi-dimensional vector characteristic of the respective second entity, wherein each second entity is associated with one or more first entities, and wherein the one or more first entities are service providers and the plurality of second entities are clients of the one or more first entities;
    reducing, by the entity characterisation system, the dimensionality of the numerical representations of the plurality of second entities to produce a plurality of reduced dimensionality numerical representations;
    wherein reducing the dimensionality of the numerical representations of the second entities comprises:
    performing principal component analysis on the numerical representations of the second entities to generate a plurality of intermediate numerical representations; and
    performing Uniform Manifold Approximation and Projection (UMAP) on the intermediate second entity numerical representations to generate the plurality of reduced dimensionality numerical representations;
    determining, by the entity characterisation system, a specialisation of each of the one or more first entities based on the respective plurality of reduced dimensionality numerical representations, wherein the specialisation of each of the one or more first entities is characteristic of similarities between the second entities of the respective first entity, and wherein determining the specialisation of each of the one or more first entities comprises:
    centring a kernel function on each of the plurality of respective reduced dimensionality numerical representations of the respective one or more first entities; and summing each of the kernel functions to determine a specialisation function of the respective one or more first entities, wherein the specialisation function is indicative of the specialisation;
    encoding, by the entity characterisation system, the specialisation function into one or more visual representation display objects; and
    providing, by the entity characterisation system, the one or more visual representation display objects on a user interface of a first computing device, wherein the visual representation display objects provide a visual representation of the specialisation function, and wherein the visual representation comprises an indication of one or more areas of relatively high density indicative of one or more respective more common classes of client of the service provider and one or more areas of relatively low density indicative of less common classes of client of the service provider.

2. The computer-implemented method of claim 1, wherein the specialisation numerical representation comprises one or more local maximum of the specialisation function.

3. The computer-implemented method of claim 1, wherein determining the specialisation of each of the plurality of first entities comprises a kernel density estimation.

4. The method of claim 1, further comprising:
    receiving, from a user of a second computing device, a candidate second entity interested in engaging services of a first entity that specialises in providing services to second entities operating in the industry of the candidate second entity;
    determining, by the entity characterisation system, a numerical representation of the candidate second entity, wherein the numerical representation of the candidate second entity is a multi-dimensional vector characteristic of the candidate second entity;
    reducing, by the entity characterisation system, the dimensionality of the numerical representation of the candidate second entity to produce a reduced dimensionality numerical representation of the candidate second entity;
    comparing, by the entity characterisation system, the reduced dimensionality numerical representation of the candidate second entity to the specialisation of each of the one or more first entities;
    determining one or more suggested first entities specialising in providing services to second entities operating in the industry of the candidate second entity based on the proximity of the reduced dimensionality numerical representation of the candidate second entity to the specialisation of each of the one or more first entities; and
    providing, by the entity characterisation system, a recommendation display object of the one or more suggested first entities to the second computing device.

5. The computer-implemented method of claim 4, further comprising classifying the candidate second entity, wherein said classifying comprises determining a matching score for one or more of the first entities, the matching score being indicative of a suitability of the relevant first entity to the candidate second entity.

6. The computer-implemented method of claim 5, wherein the matching score is based on the comparison of the reduced dimensionality numerical representation of the candidate second entity to the specialisation of each of the plurality of first entities.

7. The computer-implemented method of claim 6, the matching scores are each related to a distance between the reduced dimensionality numerical representation of the candidate second entity and the relevant specialisation numerical representation.

8. The computer-implemented method of claim 5, wherein the one or more suggested first entities are determined based on the matching scores.

9. A non-transitory computer-readable storage medium storing instructions that, when executed by a computer, cause the computer to perform operations including:

determining a numerical representation of each of a plurality of second entities, each numerical representation comprising a multi-dimensional vector characteristic of the respective second entity, wherein each second entity is associated with one or more first entities, and wherein the one or more first entities are service providers and the plurality of second entities are clients of the one or more first entities;

reducing the dimensionality of the numerical representations of the plurality of second entities to produce a plurality of reduced dimensionality numerical representations; wherein reducing the dimensionality of the numerical representations of the second entities comprises:

performing principal component analysis on the numerical representations of the second entities to generate a plurality of intermediate numerical representations; and performing Uniform Manifold Approximation and Projection (UMAP) on the intermediate second entity numerical representations to generate the plurality of reduced dimensionality numerical representations;

determining a specialisation of each of the plurality of first entities based on the respective plurality of reduced dimensionality numerical representations, wherein the specialisation of each of the one or more first entities is characteristic of similarities between the second entities of the respective first entity, and wherein determining the specialisation of each of the one or more first entities comprises:

centring a kernel function on each of the plurality of respective reduced dimensionality numerical representations of the respective one or more first entities; and summing each of the kernel functions to determine a specialisation function of the respective one or more first entities, wherein the specialisation function is indicative of the specialisation;

encoding, by the entity characterisation system, the specialisation function into one or more visual representation display objects; and providing, by the entity characterisation system, the one or more visual representation display objects on a user interface of a first computing device, wherein the visual representation display objects provide a visual representation of the specialisation function, and wherein the visual representation comprises an indication of one or more areas of relatively high density indicative of one or more respective more common classes of client of the service provider and one or more areas of relatively low density indicative of less common classes of client of the service provider.

10. The non-transitory computer-readable storage medium of claim 9, wherein the operations further include:

receiving, from a user of a second computing device, a candidate second entity interested in engaging services of a first entity that specialises in providing services to second entities operating in the industry of the candidate second entity;

determining, by the entity characterisation system, a numerical representation of the candidate second entity, wherein the numerical representation of the candidate second entity is a multi-dimensional vector characteristic of the candidate second entity;

reducing, by the entity characterisation system, the dimensionality of the numerical representation of the candidate second entity to produce a reduced dimensionality numerical representation of the candidate second entity;

comparing, by the entity characterisation system, the reduced dimensionality numerical representation of the candidate second entity to the specialisation of each of the one or more first entities;

determining one or more suggested first entities specialising in providing services to second entities operating in the industry of the candidate second entity based on the proximity of the reduced dimensionality numerical representation of the candidate second entity to the specialisation of each of the one or more first entities; and providing, by the entity characterisation system, a recommendation display object of the one or more suggested first entities to the second computing device.

11. The non-transitory computer-readable storage medium of claim 10, wherein the operations further include classifying the candidate second entity, wherein said classifying comprises determining a matching score for one or more of the first entities, the matching score being indicative of a suitability of the relevant first entity to the candidate second entity.

12. The non-transitory computer-readable storage medium of claim 11, wherein the matching score is based on the comparison of the reduced dimensionality numerical representation of the candidate second entity to the specialisation of each of the plurality of first entities.

13. The non-transitory computer-readable storage medium of claim 12, wherein the matching scores are each related to a distance between the reduced dimensionality numerical representation of the candidate second entity and the relevant specialisation numerical representation.

14. The computer-implemented method of claim 11, wherein the one or more suggested first entities are determined based on the matching scores.

15. An entity characterisation system comprising:

at least one processor; and a memory storing program instructions accessible by the at least one processor, and configured to cause the at least one processor to:

determine a numerical representation of each of a plurality of second entities, each numerical representation comprising a multi-dimensional vector characteristic of the respective second entity, wherein each second entity is associated with one or more first entities, and wherein the one or more first entities are service providers and the plurality of second entities are clients of the one or more first entities;

reduce the dimensionality of the numerical representations of the plurality of second entities to produce a plurality of reduced dimensionality numerical representations; wherein reducing the dimensionality of the numerical representations of the second entities comprises:

performing principal component analysis on the numerical representations of the second entities to generate a plurality of intermediate numerical representations; and performing Uniform Manifold Approximation and Projection (UMAP) on the intermediate second entity numerical representations to generate the plurality of reduced dimensionality numerical representations;

determine a specialisation of each of the plurality of first entities based on the respective plurality of reduced dimensionality numerical representations, wherein the specialisation of each of the one or more first entities is characteristic of similarities between the second entities of the respective first entity, and wherein determining the specialisation of each of the one or more first entities comprises:

centring a kernel function on each of the plurality of respective reduced dimensionality numerical representations of the respective one or more first entities; and summing each of the kernel functions to determine a specialisation function of the respective one or more first entities, wherein the specialisation function is indicative of the specialisation; encoding, by the entity characterisation system, the specialisation function into one or more visual representation display objects; and providing, by the entity characterisation system, the one or more visual representation display objects on a user interface of a first computing device, wherein the visual representation display objects provide a visual representation of the specialisation function, and wherein the visual representation comprises an indication of one or more areas of relatively high density indicative of one or more respective more common classes of client of the service provider and one or more areas of relatively low density indicative of less common classes of client of the service provider.

16. The entity characterisation system of claim 15, further configured to:

receive, from a user of a second computing device, a candidate second entity interested in engaging services of a first entity that specialises in providing services to second entities operating in the industry of the candidate second entity;

determine, by the entity characterisation system, a numerical representation of the candidate second entity, wherein the numerical representation of the candidate second entity is a multi-dimensional vector characteristic of the candidate second entity;

reduce, by the entity characterisation system, the dimensionality of the numerical representation of the candidate second entity to produce a reduced dimensionality numerical representation of the candidate second entity;

compare, by the entity characterisation system, the reduced dimensionality numerical representation of the candidate second entity to the specialisation of each of the one or more first entities;

determine one or more suggested first entities specialising in providing services to second entities operating in the industry of the candidate second entity based on the proximity of the reduced dimensionality numerical representation of the candidate second entity to the specialisation of each of the one or more first entities; and provide, by the entity characterisation system, a recommendation display object of the one or more suggested first entities to the second computing device.

17. The entity characterisation system of claim 16, further configured to classify the candidate second entity, wherein said classifying comprises determining a matching score for one or more of the first entities, the matching score being indicative of a suitability of the relevant first entity to the candidate second entity.

18. The entity characterisation system of claim 17, wherein the matching score is based on the comparison of the reduced dimensionality numerical representation of the candidate second entity to the specialisation of each of the plurality of first entities.

19. The entity characterisation system of claim 18, wherein the matching scores are each related to a distance between the reduced dimensionality numerical representation of the candidate second entity and the relevant specialisation numerical representation.

20. The entity characterisation system of claim 17, wherein the one or more suggested first entities are determined based on the matching scores.

* * * * *